(12) United States Patent
Abbas et al.

(10) Patent No.: US 12,003,692 B2
(45) Date of Patent: Jun. 4, 2024

(54) SYSTEMS, METHODS AND APPARATUS FOR COMPRESSING VIDEO CONTENT

(71) Applicant: GoPro, Inc., San Mateo, CA (US)

(72) Inventors: Adeel Abbas, Carlsbad, CA (US); Balineedu Chowdary Adsumilli, San Francisco, CA (US); David Newman, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 363 days.

(21) Appl. No.: 17/545,156

(22) Filed: Dec. 8, 2021

(65) Prior Publication Data
US 2022/0103800 A1 Mar. 31, 2022

Related U.S. Application Data

(60) Continuation of application No. 16/866,447, filed on May 4, 2020, now Pat. No. 11,228,749, which is a
(Continued)

(51) Int. Cl.
H04N 13/161 (2018.01)
H04N 13/111 (2018.01)
H04N 13/194 (2018.01)
H04N 13/243 (2018.01)
H04N 13/282 (2018.01)
(Continued)

(52) U.S. Cl.
CPC ......... H04N 13/161 (2018.05); H04N 13/111 (2018.05); H04N 13/194 (2018.05); H04N 13/243 (2018.05); H04N 13/282 (2018.05); H04N 13/344 (2018.05); H04N 19/597 (2014.11); H04N 23/51 (2023.01); H04N 23/698 (2023.01)

(58) Field of Classification Search
CPC .. H04N 13/111; H04N 13/161; H04N 13/194; H04N 13/243; H04N 13/282; H04N 13/344; H04N 19/597; H04N 23/51; H04N 23/698
See application file for complete search history.

(56) References Cited

U.S. PATENT DOCUMENTS 5,649,032 A 7/1997 Burt
6,389,179 B1 5/2002 Katayama
(Continued)

OTHER PUBLICATIONS

Brainard R.C., et al., "Low-Resolution TV: Subjective Effects of Frame Repetition and Picture Replenishment," Bell Labs Technical Journal, Jan. 1967, vol. 46 (1), pp. 261-271.
(Continued)

Primary Examiner — Jeremiah C Hallenbeck-Huber
(74) Attorney, Agent, or Firm — Young Basile Hanlon & MacFarlane, P.C.

(57) ABSTRACT

A device includes a processor that is configured to obtain first facets of a first wide field-of-view image. An object is identified in a facet of the first facets. A second wide field-of-view image is obtained. A location of the object is identified in the second wide field-of-view image. Using the location of the object, the second wide field-of-view image is partitioned into second facets such that no boundary of any of the second facets overlaps the object. The second facets are then encoded in a compressed bitstream.

20 Claims, 15 Drawing Sheets

Related U.S. Application Data division of application No. 15/259,512, filed on Sep. 8, 2016, now Pat. No. 10,645,362.

(60) Provisional application No. 62/336,538, filed on May 13, 2016, provisional application No. 62/321,046, filed on Apr. 11, 2016.

(51) Int. Cl.
    *H04N 13/344*     (2018.01)
    *H04N 19/597*     (2014.01)
    *H04N 23/51*     (2023.01)
    *H04N 23/698*     (2023.01)

(56) References Cited

U.S. PATENT DOCUMENTS

| | | | |
|---|---|---|---|
| 8,606,073 B2 | 12/2013 | Woodman | |
| 9,171,577 B1 | 10/2015 | Newman | |
| 9,277,122 B1* | 3/2016 | Imura | H04N 23/683 |
| 9,355,433 B1 | 5/2016 | Adsumilli | |
| 9,369,689 B1* | 6/2016 | Tran | H04N 13/167 |
| 9,575,803 B2 | 2/2017 | Chauvet | |
| 10,645,362 B2 | 5/2020 | Abbas | |
| 11,228,749 B2 | 1/2022 | Abbas | |
| 2003/0007567 A1 | 1/2003 | Newman | |
| 2003/0035047 A1 | 2/2003 | Katayama | |
| 2005/0226483 A1* | 10/2005 | Geiger | G06T 19/00 382/128 |
| 2006/0256397 A1 | 11/2006 | Cui | |
| 2006/0268131 A1 | 11/2006 | Cutler | |
| 2007/0064800 A1* | 3/2007 | Ha | H04N 19/31 375/E7.125 |
| 2007/0237420 A1 | 10/2007 | Steedly | |
| 2012/0008681 A1* | 1/2012 | Lundin | H04N 19/895 375/E7.243 |
| 2012/0242788 A1* | 9/2012 | Chuang | H04N 23/62 348/E7.001 |
| 2012/0307000 A1 | 12/2012 | Doepke | |
| 2014/0218354 A1* | 8/2014 | Park | G06T 3/4038 345/419 |
| 2014/0376634 A1* | 12/2014 | Guo | H04N 19/154 375/240.16 |
| 2015/0065803 A1 | 3/2015 | Douglas | |
| 2015/0103916 A1* | 4/2015 | Gisquet | H04N 19/52 375/240.16 |
| 2015/0109468 A1 | 4/2015 | Laroia | |
| 2015/0124877 A1* | 5/2015 | Choi | H04N 19/61 375/240.12 |
| 2015/0138311 A1* | 5/2015 | Towndrow | H04N 23/698 348/36 |
| 2015/0249813 A1* | 9/2015 | Cole | H04L 65/70 386/241 |
| 2015/0264396 A1* | 9/2015 | Zhang | H04N 19/593 375/240.16 |
| 2015/0271517 A1* | 9/2015 | Pang | H04N 19/52 375/240.16 |
| 2015/0341552 A1* | 11/2015 | Chen | G06T 11/60 348/38 |
| 2015/0341557 A1* | 11/2015 | Chapdelaine-Couture | H04N 13/246 348/38 |
| 2015/0346832 A1* | 12/2015 | Cole | H04N 13/243 345/156 |
| 2016/0012855 A1* | 1/2016 | Krishnan | H04N 21/21805 386/241 |
| 2016/0065947 A1* | 3/2016 | Cole | H04N 13/366 348/43 |
| 2016/0134809 A1* | 5/2016 | Ishikuri | H04N 23/698 348/36 |
| 2016/0142697 A1* | 5/2016 | Budagavi | H04N 13/106 348/43 |
| 2016/0241892 A1* | 8/2016 | Cole | H04N 19/172 |
| 2016/0253795 A1* | 9/2016 | Cole | G06T 11/40 345/426 |
| 2016/0274338 A1 | 9/2016 | Davies | |
| 2016/0295128 A1* | 10/2016 | Schnittman | H04N 7/147 |
| 2016/0337706 A1* | 11/2016 | Hwang | H04N 21/23614 |
| 2017/0126968 A1* | 5/2017 | Somanath | H04N 13/15 |
| 2017/0295356 A1 | 10/2017 | Abbas | |
| 2020/0336725 A1 | 10/2020 | Abbas | |

OTHER PUBLICATIONS

Burt et al., 'A Multiresolution Spline with Application to Image Mosaics,' in ACM Transactions on Graphics (TOG), 1983, vol. 2, No. 4, pp. 217-236.

Lowe D.G., 'Object Recognition From Local Scale-invariant Features,' Computer vision, The proceedings of the seventh IEEE international conference on 1999, vol. 2, pp. 1150-1157.

Thaipanich T., et al., "Low Complexity Algorithms for Robust Video frame rate up-conversion (FRUC) technique," IEEE Transactions on Consumer Electronics, Feb. 2009, vol. 55 (1),pp. 220-228.

Zhai et al., "A Low Complexity Motion Compensated Frame Interpolation Method," in IEEE International Symposium on Circuits and Systems (2005), pp. 4927-4930.

Zhang., "A Flexible New Technique for Camera Calibration" IEEE Transactions, dated Nov. 2000, vol. 22, No. 11, pp. 1330-1334.

Barghout L. and Sheynin J., 'Real-world scene perception and perceptual organization: Lessons from Computer Vision'. Journal of Vision, 2013, vol. 13 (9). (Abstract). 1 page.

Kendall A., et al., 'Bayesian Segnet: Model Uncertainty in Deep Convolutional Encoder-Decoder Architectures for Scene Understanding,' arXiv: 1511.02680, 2015. (11 pages).

Mitzel D., et al., 'Video Super Resolution Using Duality Based TV-I1 Optical Flow,' Joint Pattern Recognition Symposium, 2009, pp. 432-441.

Vass, J., et al., 'Efficient Three-Dimensional Wavelet Codecs for Networked Video Communication,' in Proceedings of IEEE International Conference on Image Processing, Kobe, Japan, Oct. 1999, pp. 565-569.

Barghout L., 'Visual Taxometric approach Image Segmentation using Fuzzy-Spatial Taxon Cut Yields Contextually Relevant Regions,' Communications in Computer and Information Science (CCIS), Springer-Verlag, 2014, pp. 163-173.

Chang H., et al., 'Super-resolution Through Neighbor Embedding,' Computer Vision and Pattern Recognition, 2004. CVPR2004. Proceedings of the 2004 IEEE Computer Society Conference on, vol. 1, 2004. 8 pages.

Elen, 'Whatever happened to Ambisonics' AudioMedia Magazine, Nov. 1991. 18 pages.

Gracias, et al., 'Fast Image Blending Using Watersheds and Graph Cuts,' Image and Vision Computing, 2009, vol. 27 (5), pp. 597-607.

Grois, et al., "Efficient Adaptive Bit-Rate Control for ROI Scalable Video Coding", Workshop on Picture Coding and Image Processing 2010; Jul. 12, 2010-Jul. 12, 2010; Nagoya, Dec. 7, 2010 (Dec. 7, 2010), XP030082089, 2 pages.

Grois, et al., 'Recent Advances in Region-of-Interest Video Coding' In: 'Recent Advances on Video Coding', Jul. 5, 2011 (Jul. 5, 2011), InTech, XP055257835, ISBN: 978-953-30-7181-7 DOI: 10.5772/17789, 29 pages.

Ichimura D., et al., 'Slice Group Map for Mult. Interactive ROI Seal', 17. JVT Meeting; 74. MPEG Meeting; Oct. 14, 2005-Oct. 21, 2005; Nice, FR;(Joint Video Team of ISO/IEC JTC1/SC29/WG11 and ITU-T SG.16), No. JVT-Q020r1, Oct. 14, 2005 (Oct. 14, 2005), XP030006183, ISSN: 0000-0413. 20 pages.

Won, et al., 'Size-Controllable Region-of-Interest in Scalable Image Representation', IEEE Transactions on Image Processing, IEEE Service Center, Piscataway, NJ, US, vol. 20, No. 5, May 1, 2011 (May 1, 2011 ), pp. 1273-1280, XPO 11411787, ISSN: 1057-7149, DOI: 10.1109/TIP.2010.2090534.

Xiao, et al., 'Multiple View Semantic Segmentation for Street View Images,' 2009 IEEE 12th International Conference on Computer Vision, 2009, pp. 686-693.

(56) References Cited

OTHER PUBLICATIONS

H.264 (Oct. 2012) and/or ISO/IEC 14496-10:2012, Information technology—Coding of audio-visual objects—Part 10: Advanced Video Coding, 402 pages.
Chan et al., 'Active contours without edges'. IEEE Transactions on Image Processing, 2001, 10 (2), pp. 266-277 (hereinafter 'Chan').
Achanta R., et al., 'Slic Superpixeis Gompared to State-of-The-Art Superpixei Methods,' IEEE Transactions on Pattern Analysis and Machine intelligence, 2012, vol. 34 (11), pp. 2274-2282.
Allene C, et al,, 'Seamless Image-based Texture Atlases Using Multi-band Blending,' Pattern Recognition, 2008. ICPR 2008. 19th International Conference on, 2008. 4 pages.
Badrinarayanan V., et al., 'Segnet: a Deep Convoiutional Encoder-Decoder Architecture for Image Segmentation,' arXiv preprint arXiv: 1511.00561, 2015. 14 pages.
Perez et al., 'Poisson Image Editing,' in ACM Transactions on Graphics (TOG), 2003, vol. 22, No. 3, pp. 313-318.
Herbst E., et al., 'Occlusion Reasoning for Temporal Interpolation Using Optical Flow,' Department of Computer Science and Engineering, University of Washington, Tech. Rep. UW-CSE-09-08-01, 2009. 41 pages.
Jakubowski M., et aL, 'Block-based motion estimation algorithmsa survey,' Opto-Eiectronics Review 21, No. 1 (2013), pp. 88-102.
Suzuki et al., 'Inter Frame Coding with Template Matching Averaging,' in IEEE international Conference on Image Processing Proceedings (2007), vol. (ill), pp. 409-412.
Beier et al., 'Feature-Based Image Metamorphosis,' in Computer Graphics Journal, Jul. 1992, vol. 28 (2), pp. 35-42.
High Efficiency Video Coding (HEVC), also known as H.265 (described in e.g., ITU-T Study Group 16—Video Coding Experts Group (VCEG)—ITU-T H.265, and/or ISO/IEC JTC 1/SC 29/WG 11 Motion Picture Experts Group (MPEG)—the HEVC standard ISO/IEC 23008-2:2015, 657 pages.
Xiong Y et al., 'Gradient Domain Image Blending and Implementation on Mobile Devices,' International Conference on Mobile Computing, Applications, and Services, Springer Berlin Heidelberg, 2009, pp. 293-306.
Bay H., et al., 'Surf: Speeded up Robust Features,' European Conference on Computer Vision, Springer Berlin Heidelberg, 2006, pp. 404-417.
Schick A., et al., "Improving Foreground Segmentations with Probabilistic Superpixel Markov Random Fields," 2012 IEEE Computer Society Conference on Computer Vision and Pattern Recognition Workshops, 2012, pp. 27-31.
Schwartz, E., et al., "Implementation of Compression with Reversible Embedded Wavelets," In Proc. SPIE, 1995, 12 pages.
Ugur et al., "MV-HEVC/SHVC HLS: On default Output Layer Sets", Jan. 2014. 4 pages.
Szeliski R., "Computer Vision: Algorithms and Applications," Springer Science & Business Media, 2010, 979 pages.

\* cited by examiner

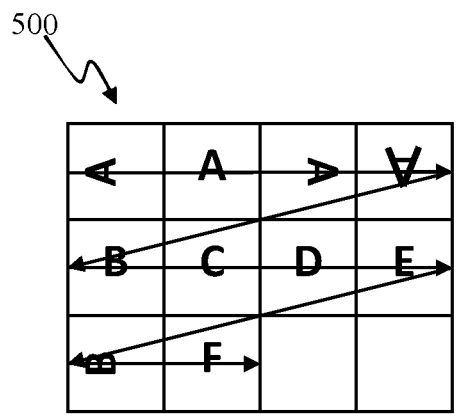
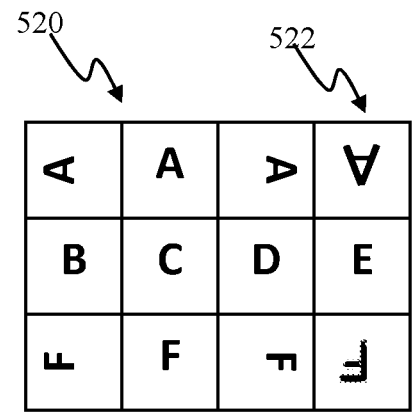
FIG. 5A  FIG. 5B
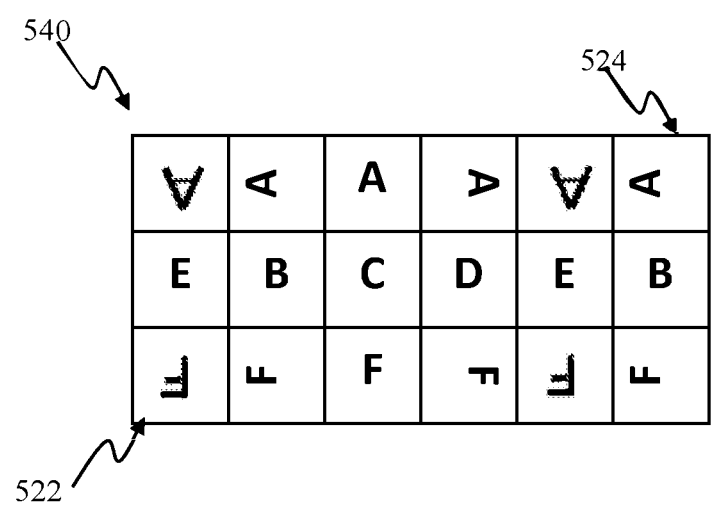
FIG. 5C

SYSTEMS, METHODS AND APPARATUS FOR COMPRESSING VIDEO CONTENT

CROSS-REFERENCE TO RELATED APPLICATION(S)

This application is a continuation of U.S. patent application Ser. No. 16/866,447 entitled "SYSTEMS, METHODS AND APPARATUS FOR COMPRESSING VIDEO CONTENT" filed May 4, 2020, which is a divisional and claims the benefit of priority to U.S. patent application Ser. No. 15/259,512 entitled "SYSTEMS, METHODS AND APPARATUS FOR COMPRESSING VIDEO CONTENT" filed Sep. 8, 2016, now U.S. Pat. No. 10,645,362, which claims the benefit of priority to U.S. Provisional Application Ser. No. 62/321,046 entitled "SYSTEMS AND METHODS FOR COMPRESSING VIDEO CONTENT" filed Apr. 11, 2016, and U.S. Provisional Application Ser. No. 62/336,538 entitled "SYSTEMS AND METHODS FOR COMPRESSING VIDEO CONTENT" filed May 13, 2016, the entire disclosures of which are hereby incorporated by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates generally to storing and/or presenting of image data and/or video content, and more particularly in one exemplary aspect to encoding, decoding, and transmission of video content.

BACKGROUND

Commodity camera technologies are generally fabricated to optimize image capture from a single vantage point. Single vantage capture is poorly suited for virtual reality (VR) and panoramic uses which require much wider fields of view (FOV); thus, many existing applications for wide FOV use multiple cameras to capture different vantage points of the same scene. The source images are then stitched together (e.g., in post-processing) to create the final panoramic image or other wide field of view content.

Existing techniques for stitching together wide field of view content from multiple images require significant computing resources. Artisans of ordinary skill in the related arts will recognize that the sheer quantity data that must be processed consumes significant memory resources, and the image manipulation algorithms are computationally expensive. For example, VR video content and/or panoramic video content can be characterized by high resolution and high data rates (e.g., 8192×4096 resolution in excess of 30 megabits per second (Mbps)). The aforementioned limitations significantly reduce the ability and convenience for consumers to create and share VR content. For example, a user may be able to capture the raw images needed to create a 360° panorama on a camera phone or other portable device; however, they must upload the images to a powerful computer or server to stitch together the image.

To these ends, solutions are needed to reduce resource requirements for stitching devices so as to enable panoramic and other wide FOV content capture on commodity components (e.g., processors and memories). Ideally, such solutions would enable users to capture and conveniently review high data rate content on a resource limited device (e.g., battery operated computer, a tablet, smartphone or a head mounted display), and/or other devices that may be characterized by a given amount of available energy, data transmission bandwidth, and/or computational capacity.

SUMMARY

The present disclosure satisfies the foregoing needs by providing, inter alia, systems, methods, and apparatus for encoding panoramic image content.

A system configured to use continuity between image facets to improve encoding is disclosed. Various embodiments of the present disclosure include: a network interface; one or more physical processors; and a storage apparatus in data communication with the one or more physical processors. In one exemplary embodiment, the storage apparatus includes machine readable instructions that are configured to, when executed by the one or more physical processors, cause the system to: partition an image into facets; encode the facets; transform the encoded facets; and encode other image facets based on the transformed encoded facets. In some variants, the encoded facets may be transmitted or displayed.

In some variants, the transformations may include one or more operations selected from: rotation, vertical flipping, horizontal flipping, translation, warping, and scaling.

The images may include one or more virtual reality (VR) content, spherical fields of view, or other forms of content. In some variants, the content is a plurality of source images captured by a plurality of image sensors; where the plurality of source images are aligned and stitched to produce the image.

In some variants, the machine readable instructions further cause the system to project the image according to various projections, such as a cubic projection or an isocahedron projection.

In some variants, the machine readable instructions are configured to, cause the system to encode at least a portion of a video stream based on the transformed encoded facets.

In some other variants, one facet corresponds to an a first camera, and another facet corresponds to a second camera.

A system configured to use an augmented image to improve encoding is disclosed. In one exemplary embodiment the system includes: one or more physical processors; and a storage apparatus in data communication with the one or more physical processors. In one exemplary embodiment, the machine readable instructions are configured to, when executed by the one or more physical processors, cause the system to: partition an image into a first image facet and a second image facet; encode the first image facet; transform the encoded first image facet; combine the transformed encoded first image facet with the partitioned image to form the augmented image; encode the second image facet based on the augmented image; and transmit at least the augmented image and the encoded second image facet to a display device for display.

In one such variant, the machine readable instructions cause the system to utilize at least one continuity across a boundary between the transformed encoded first image facet and another encoded image facet of the augmented image.

In some cases, the system may include a codec that employs raster pixel scan order.

In other cases the system includes a codec that is configured to effectuate motion prediction in top-to-bottom and left-to-right directions.

In still other cases, the machine readable instructions cause the system to select facet boundaries such that representation of an object is within the facet boundaries. In some such cases, the selection of facet boundaries is performed adaptively using motion information associated with a sensing apparatus that has captured the object.

A system configured to use a reference frame for inter mode encoding is disclosed. In one embodiment, the system includes one or more physical processors; and a storage apparatus in data communication with the one or more physical processors. In one exemplary embodiment, the system is configured to: obtain a partitioned image; form a reference frame; and encode a frame of a video stream based at least partly on information from the reference frame.

In one variant, the information from the reference frame comprises at least one of pixel data, motion vector data, and/or transform size data.

In another variant, the system is configured to select a configuration for the reference frame based at least partly on a target performance metric.

In still another variant, a partitioned image corresponds to another frame of the video stream.

In some variants, the first set of one or more image facets is an encoded image facet. In other variants, the first set of one or more image facets is a transformed encoded image facet.

A computerized method of processing image data is disclosed. In one embodiment, the method includes: obtaining a first image; determining at least one transformation to be applied to the first image to create a second image; encoding the first image; and transmitting the encoded first image and data regarding the transformation, so as to obviate having to encode and transmit the second image.

In one such variant, the first image is associated with a first time and first subject matter, and the second image is associated with a second time and the first subject matter; and the transformation comprises a linear translation in space.

In other variants, the method includes obtaining a facet of a larger, composite image, and the second image is a facet of the same composite image.

Other features and advantages of the present disclosure will immediately be recognized by persons of ordinary skill in the art with reference to the attached drawings and detailed description of exemplary embodiments as given below.

In another aspect, a device includes a processor that is configured to obtain first facets of a first wide field-of-view image; identify an object in a facet of the first facets; obtain a second wide field-of-view image; identify a location of the object in the second wide field-of-view image; partition, using the location of the object, the second wide field-of-view image into second facets such that no boundary of any of the second facets overlaps the object; and encode the second facets in a compressed bitstream.

In another aspect, a method for reducing decoding artefacts includes performing a first cube projection operation on a first wide field-of-view image to obtain first facets; identifying an object in one of the first facets; performing a second cube projection operation on a second wide field-of-view image to obtain second facets, where the second cube projection operation is such that no boundary of any of the second facets overlaps the object, and where the second wide field-of-view image is obtained at a different time from the first wide field-of-view image; and encoding at least one of the second facets using at least one of the first facets.

In another aspect, a non-transitory computer readable medium stores instructions operable to cause one or more processors to perform operations to reduce decoding artefacts. The operations include operations to obtain a first image and a second image, where the first image and the second image are images of a wide field-of-view image; use parallax information obtained using an overlap region between the first image and the second image to detect relative distances of a first object and a second object in at least one of the first image or the second image from one or more imaging devices used to obtain the first image and the second image, where the first object is detected to be farther away than the second object; partition the wide field-of-view image into facets based on the relative distances such that no boundary of any of the facets overlaps the second object; and encode the facets of the wide field-of-view image

BRIEF DESCRIPTION OF THE DRAWINGS

FIG. 5A is a functional block diagram illustrating encoder configuration for intra-mode image compression methodology, in accordance with one implementation.

FIG. 5B is a functional block diagram illustrating image encoder configuration for inter-mode image compression methodology, in accordance with one implementation.

FIG. 5C is a functional block diagram illustrating image encoder configuration for inter-mode image compression methodology, in accordance with one implementation.

Figure 1:
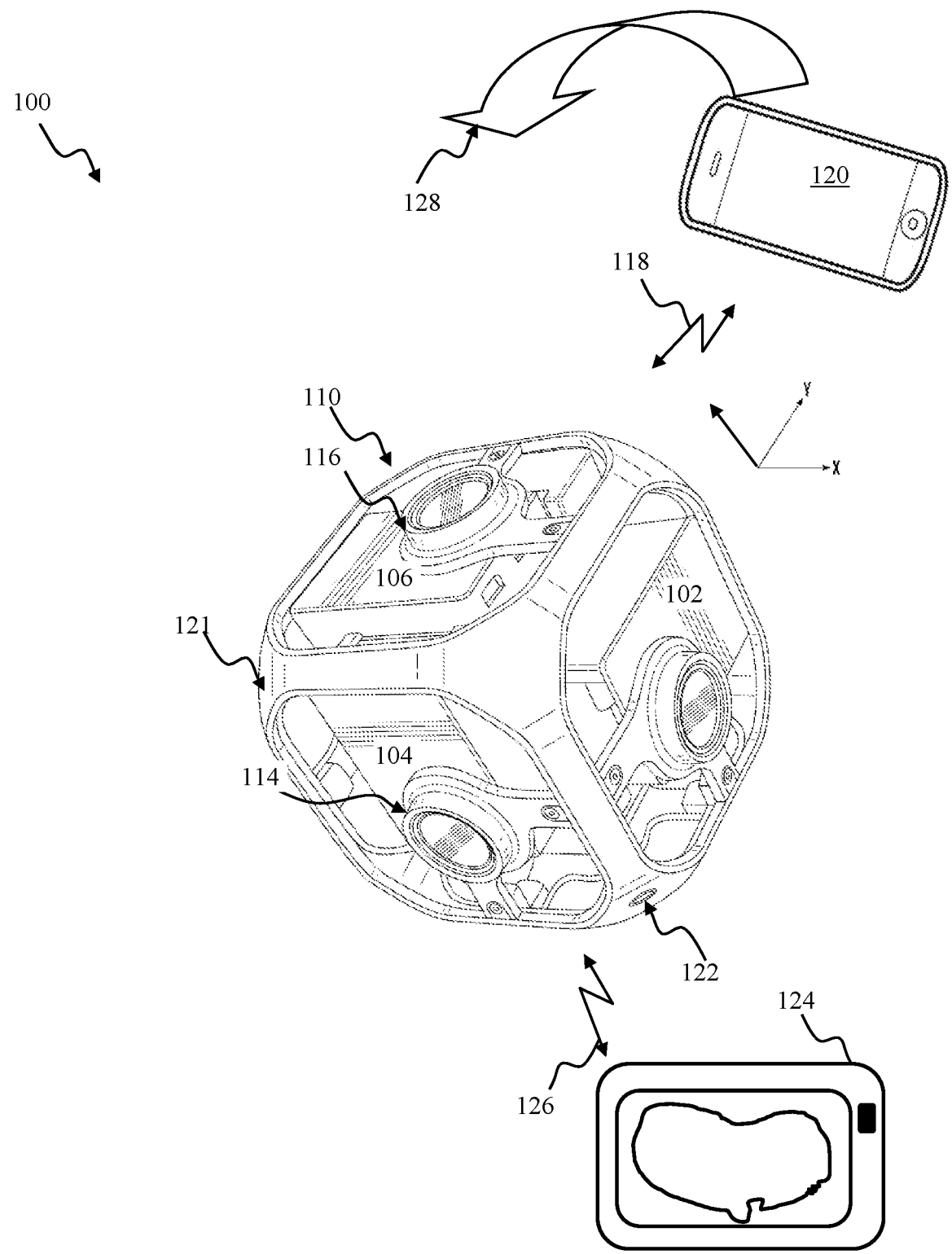
FIG. 1 is a functional block diagram illustrating a system for panoramic content capture and viewing in accordance with one implementation.

All Figures disclosed herein are © Copyright 2016 GoPro Inc. All rights reserved.

DETAILED DESCRIPTION

Implementations of the present technology will now be described in detail with reference to the drawings, which are provided as illustrative examples, so as to enable those skilled in the art to practice the technology. Notably, the figures and examples below are not meant to limit the scope of the present disclosure to a single implementation or implementations, but other implementations are possible by way of interchange of or combination with some or all of the described or illustrated elements. For instance the same ideas are also applicable to icosahedron or octahedron projections. Wherever convenient, the same reference numbers will be used throughout the drawings to refer to same or like parts.

Systems, methods, and apparatus for encoding panoramic imaging content are provided. Panoramic content (e.g., content captured using 180 degree, 360-degree view field, and/or other fields of view) and/or virtual reality (VR) content, may be characterized by high image resolution (e.g., 8192×4096 pixels at 90 frames per second (also called BK resolution)) and/or high bit rates (e.g., up to 100 megabits per second (mbps)). Imaging content characterized by full circle coverage (e.g., 180°×360° or 360°×360° field of view) may be referred to as spherical content. Presently available standard video compression codecs, e.g., H.264 (described in ITU-T H.264 (January 2012) and/or ISO/IEC 14496-10:2012, Information technology—Coding of audio-visual objects—Part 10: Advanced Video Coding, each of the foregoing incorporated herein by reference in its entirety), High Efficiency Video Coding (HEVC) (also known as H.265, described in e.g., ITU-T Study Group 16—Video Coding Experts Group (VCEG)-ITU-T H.265, and/or ISO/IEC JTC 1/SC 29/WG 1 Motion Picture Experts Group (MPEG)—publishes the HEVC standard as ISO/IEC 2 3008-2:2015, each of the foregoing incorporated herein by reference in its entirety), and/or the VP9 video codec, may prove non-optimal for distributing and decoding panoramic content on a resource limited devices.

A resource limited device is defined as a device that is limited by one or more of the following: 1) processing power 2) bandwidth 3) latency.

Panoramic and/or virtual reality content may be viewed by a client device □using a "viewport" into the extent of the panoramic image. As used herein, the term "viewport" refers generally to an actively displayed region of a larger image content that is being displayed, rendered, or otherwise made available for presentation. For example, as previously noted, a panoramic image or other wide FOV content is larger and/or has different dimensions than the screen capabilities of a display device. Accordingly, a user may select only a portion of the content for display (i.e., the viewport) by e.g., zooming in/out on a spatial position within the content. In another example, a 2D viewpoint may be rendered and displayed dynamically based on a computer model of a virtualized 3D environment, so as to enable virtual reality, augmented reality, or other hybridized reality environment.

As previously alluded to, in some implementations, the viewing dimension(s) of the viewport do not need to match the aspect of the source content, and may be configured smaller than the dimension(s) of the source content (e.g., a viewport covering 1920 pixel wide by 1080 pixel in height area may be used to view content that was obtained over an area 8192 pixels in width and 4096 pixels in height).

Artisans of ordinary skill in the related arts will readily appreciate that a viewport may be locally generated at the display device, or remotely generated by e.g., a server or other external compute apparatus (such as a content delivery network.) For example, a display device may have a local copy of the complete image content to locally render a spherical panorama. In an alternate scheme, an external server may send (and the display device may decode) a portion of high resolution video. The area where the user is looking may be in high resolution and the rest of the image may be in low resolution. When the viewer moves his/her viewport, the decoder may ask the server to transmit video data corresponding to an updated viewpoint.

FIG. 1 illustrates a capture system configured for acquiring panoramic content, in accordance with one implementation. The system 100 of FIG. 1 may include a capture apparatus 110, such as an action camera manufactured by the Assignee hereof (e.g., a GoPro device or the like, such as a HER04 Silver), and/or other image/video capture devices.

The capture apparatus 110 may include for example 6-cameras (including, e.g., cameras 104, 106, 102) disposed in a cube-shaped cage 121. The dimensions of the cage 121 may be selected between 25 mm and 150 mm, preferably 105 mm in some implementations. The cage 121 may be outfitted with a mounting port 122 configured to enable attachment of the camera to a supporting structure (e.g., tripod, photo stick). The cage 121 may provide a rigid support structure. Use of a rigid structure may, inter alia, ensure that orientation of individual cameras with respect to one another may remain at a given configuration during operation of the apparatus 110.

Individual capture devices (e.g., camera 102) may comprise a video camera device, such as described in, e.g., U.S. patent application Ser. No. 14/920,427 entitled "APPARATUS AND METHODS FOR EMBEDDING METADATA INTO VIDEO STREAM" filed on Oct. 22, 2015, the foregoing being incorporated herein by reference in its entirety.

In some implementations, the capture device may include two (2) spherical (or "fish eye") cameras that are mounted in a back-to-back configuration (also commonly referred to as a "Janus" configuration). As used herein, the term "camera" includes without limitations sensors capable of receiving electromagnetic radiation, whether in the visible band or otherwise (e.g., IR, UV), and producing image or other data relating thereto. The two (2) source images in a Janus configuration have a 180° or greater field of view (FOV); the resulting images may be stitched along a boundary between source images to obtain a panoramic image with a 360° FOV. The "boundary" in this case refers to the overlapping image data from the two (2) cameras. Stitching is necessary to reconcile differences between pixels of the source images introduced based on e.g., lighting, focus, positioning, lens distortions, color, etc. Stitching may stretch, shrink, replace, average, and/or reconstruct imaging data as a function of the input images. Janus camera systems are described in e.g., U.S. Design patent application Ser. No. 29/548,661, entitled "MULTI-LE NS CAMERA" filed on Dec. 15, 2015, and U.S. patent application Ser. No. 15/057,896, entitled "UNI- BODY DUAL-LENS MOUNT FOR A SPHERICAL CAMERA" filed on Mar. 1, 2016, which is incorporated herein by reference in its entirety.

Referring back to FIG. 1, the capture apparatus 110 may be configured to obtain imaging content (e.g., images and/or video) with 360° field of view, also referred to as panoramic or spherical content, such as e.g., those shown and described in U.S. patent application Ser. No. 14/949,786, entitled "APPARATUS AND METHODS FOR IMAGE ALIGNMENT" filed on Nov. 23, 2015, and/or U.S. patent application Ser. No. 14/927,343, entitled "APPARATUS AND METH ODS FOR ROLLING SHUTTER COMPENSATION FOR MULTI-CAMERA SYSTEMS", filed Oct. 29, 2015, each of the foregoing being incorporated herein by reference in its entirety. As described in the above-referenced applications, image orientation and/or pixel location may be obtained using camera motion sensor(s). Pixel location may be adjusted using camera motion information in order to correct for rolling shutter artifacts. As described in the above-referenced U.S. patent application Ser. No. 14/949,786, images may be aligned in order to produce a seamless stitch in order to obtain the composite frame source. Source images may be characterized by a region of overlap. A disparity measure may be determined for pixels along a border region between the source images. A warp transformation may be determined using an optimizing process configured to determine displacement of pixels of the border region based on the disparity. Pixel displacement at a given location may be constrained in a direction that is tangential to an epipolar line corresponding to the location. A warp transformation may be propagated to pixels of the image. Spatial and/or temporal smoothing may be applied. In order to obtain an optimized solution, the warp transformation may be determined at multiple spatial scales In one exemplary embodiment, the individual cameras (e.g., cameras 102, 104, 106) may be characterized by a field of view, such as 120° in longitudinal dimension and 60° in latitudinal dimension. In order to provide for an increased overlap between images obtained with adjacent cameras, the image sensors of any two adjacent cameras may be configured to overlap a field of view of 60° with respect to one another. By way of a non-limiting illustration, the longitudinal dimension of a camera 102 sensor may be oriented at 60° with respect to the longitudinal dimension of the camera 104 sensor; the longitudinal dimension of camera 106 sensor may be oriented at 60° with respect to the longitudinal dimension of the camera 104 sensor. In this manner, the camera sensor configuration illustrated in FIG. 1, may provide for 420° angular coverage in the vertical and/or horizontal planes. Overlap between multiple fields of view of adjacent cameras may provide for an improved alignment and/or stitching of multiple source images to produce, e.g., a panoramic image, particularly when source images may be obtained with a moving capture device (e.g., rotating camera).

Individual cameras of the apparatus 110 may comprise a lens, e.g., lens 114 of the camera 104, lens 116 of the camera 106. In some implementations, the individual lens may be characterized by what is referred to as a fisheye pattern and produce images characterized by a fish eye (or near-fish eye) field of view (FOV). Images captured by two or more individual cameras of the apparatus 110 may be combined using "stitching" of fisheye projections of captured images to produce an equirectangular planar image, in some implementations, such as shown in U.S. patent application Ser. No. 14/949,786, incorporated supra. In some embodiments, wide angle images captured by two or more cameras may be directly stitched in some other projection, e.g., cubic or octahedron projection.

The capture apparatus 110 may house one or more internal metadata sources, e.g., video, inertial measurement unit or accelerometer, global positioning system (GPS) receiver component and/or other metadata source. In some implementations, the capture apparatus 110 may comprise a device described in detail in U.S. patent application Ser. No. 14/920,427, entitled "APPARATUS AND METHODS FOR EMBED DING METADATA INTO VIDEO STREAM" filed on Oct. 22, 2015, incorporated supra. The capture apparatus 110 may comprise one or more optical elements e.g., the camera lenses 114 and 116. Individual optical elements may include, by way of non-limiting examples, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, polarized lens, other lens, and/or other optical elements.

The capture apparatus 110 may include one or more image sensors including, by way of non-limiting examples, one or more of charge-coupled device (CCD) sensor, active pixel sensor (APS), complementary metal-oxide semiconductor (CMOS) sensor, N-type metal-oxide-semiconductor (NMOS) sensor, and/or other image sensor. The capture apparatus 110 may include one or more microphones configured to provide audio information that may be associated with images being acquired by the image sensor.

The capture apparatus 110 may be interfaced to an external metadata source 124 (e.g., GPS receiver, cycling computer, metadata puck, and/or other device configured to provide information related to system 100 and/or its environment) via a remote link 126. The capture apparatus 110 may interface to an external user interface device 120 via the link 118. In some implementations, the device 120 may correspond to a smartphone, a tablet computer, a phablet, a smart watch, a portable computer, and/or other device configured to receive user input and communicate information with the camera capture device 110. In some implementations, the capture apparatus 110 may be configured to provide panoramic content (or portion thereof) to the device 120 for viewing.

In one or more implementations, individual links 126, 118 may utilize any practical wireless interface configuration, e.g., Wi-Fi, Bluetooth (BT), cellular data link, Zig Bee, Near Field Communications (N FC) link, e.g., using ISO/IEC 14443 protocol, IEEE Std. 802.15, 6LowPAN, Z-Wave, ANT+link, and/or other wireless communications link. In some implementations, individual links 126, 118 may be effectuated using a wired interface, e.g., HDMI, USB, digital video interface, DisplayPort interface (e.g., digital display interface developed by the Video Electronics Standards Association (VESA), Ethernet, Thunderbolt), and/or other interface.

In some implementations (not shown), one or more external metadata devices may interface to the apparatus 110 via a wired link, e.g., HDMI, USB, coaxial audio, and/or other interface. In one or more implementations, the capture apparatus 110 may house one or more sensors (e.g., GPS, pressure, temperature, accelerometer, heart rate, and/or other sensors). The metadata obtained by the capture apparatus 110 may be incorporated into the combined multimedia stream using any applicable methodologies including those described in U.S. patent application Ser. No. 14/920,427 entitled "APPARATUS AND METHODS FOR EMBEDDING METADATA INTO VIDEO STREAM" filed on Oct. 22, 2015, incorporated supra.

The user interface device 120 may operate a software application (e.g., GoPro Studio, GoPro App, and/or other application) configured to perform a variety of operations related to camera configuration, control of video acquisition, and/or display of video captured by the camera apparatus 110. An application (e.g., GoPro App) may enable a user to create short video clips and share clips to a cloud service (e.g., Instagram, Facebook, YouTube, Dropbox); perform full remote control of camera 110 functions; live preview video being captured for shot framing; mark key moments while recording with HiLight Tag; View HiLight Tags in GoPro Camera Roll for location and/or playback of video highlights; wirelessly control camera software; and/or perform other functions. Various methodologies may be utilized for configuring the camera apparatus 110 and/or displaying the captured information, including those described in U.S. Pat. No. 8,606,073, entitled "BROADCAST MANAGEMENT SYSTEM", issued Dec. 10, 2013, the foregoing being incorporated herein by reference in its entirety.

By way of an illustration, the device 120 may receive user setting characterizing image resolution (e.g., 3840 pixels by 2160 pixels), frame rate (e.g., 60 frames per second (fps)), and/or other settings (e.g., location) related to the relevant context, such as an activity (e.g., mountain biking) being captured. The user interface device 120 may communicate the settings to the camera apparatus 110.

A user may utilize the device 120 to view content acquired by the capture apparatus 110. Display of the device 120 may act as a viewport into the 3D space of the panoramic content that is captured. In some implementations, the user interface device 120 may communicate additional information (metadata) to the camera apparatus 110. By way of an illustration, the device 120 may provide orientation of the device 120 with respect to a given coordinate system, to the apparatus 110 so as to enable determination of a viewport location and/or dimensions for viewing of a portion of the panoramic content. For example, a user may rotate (sweep) the device 120 through an arc in space (as illustrated by arrow 128 in FIG. 1). The device 120 may communicate display orientation information to the capture apparatus 110. The capture apparatus 110 may provide an encoded bitstream configured to enable viewing of a portion of the panoramic content corresponding to a portion of the environment of the display location as it traverses the path 128.

The capture apparatus 110 may include a display configured to provide information related to camera operation mode (e.g., image resolution, frame rate, capture mode (sensor, video, photo)), connection status (connected, wireless, wired connection), power mode (e.g., standby, sensor mode, video mode), information related to metadata sources (e.g., heart rate, GPS), and/or other information. The capture apparatus 110 may include a user interface component (e.g., one or more buttons) configured to enable user to start, stop, pause, resume sensor and/or content capture. User commands may be encoded using a variety of approaches including but not limited to duration of button press (pulse width modulation), number of button presses (pulse code modulation), and/or a combination thereof. By way of an illustration, two short button presses may initiate sensor metadata and/or video capture mode described in detail elsewhere; a single short button press may be used to (i) communicate initiation of video and/or photo capture and cessation of video and/or photo capture (toggle mode), or (ii) video and/or photo capture for a given time duration or number of frames (hurst capture). It will be recognized by those skilled in the art that various user command communication implementations may be realized, e.g., short/long button presses.

Figure 2:
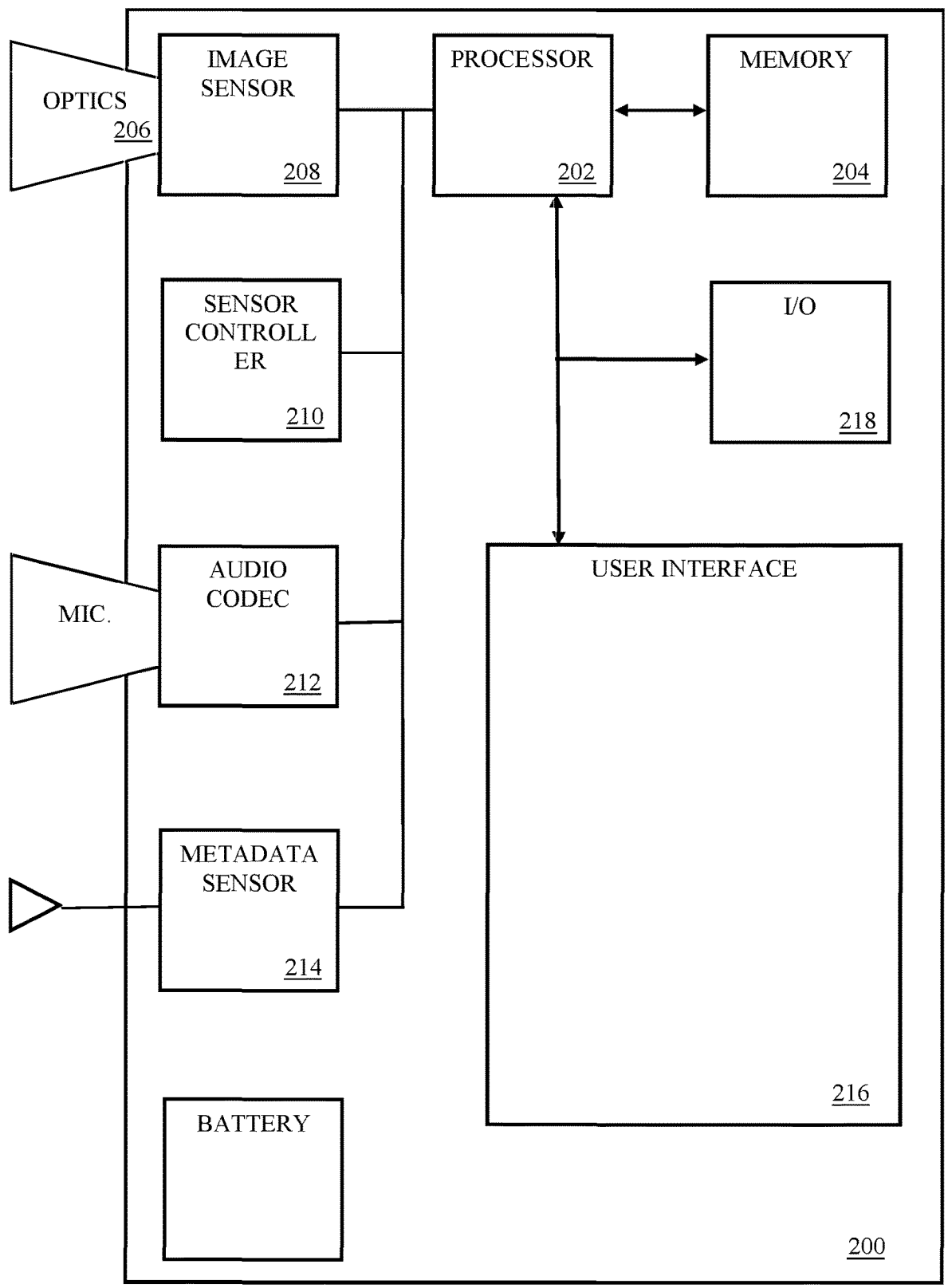
FIG. 2 is a functional block diagram illustrating a capture device for use with, e.g., the system of FIG. 1 in accordance with one implementation.

FIG. 2 illustrates one generalized implementation of an apparatus 200 for storing and/or rendering content of interest based on an original image and/or pre-fetched boundary content. The apparatus 200 of FIG. 2 may include one or more processors 202 (such as system on a chip (SOC), microcontroller, microprocessor, central processing unit (CPU), digital signal processor (DSP), application specific integrated circuit (ASIC), general processing unit (GPU), and/or other processors) that control the operation and functionality of the display device 200. In some implementations, the apparatus 200 FIG. may correspond to a VR head set or a consumer electronics device (e.g., a smart phone, tablet, PC, etc.) configured to capture, store, and/or render VR and VR-like content.

The apparatus 200 may include electronic storage 204. The electronic storage 204 may include a non-transitory system memory module that is configured to store executable computer instructions that, when executed by the processor(s) 202, perform various device functionalities including those described herein. The electronic storage 204 may also include storage memory configured to store content (e.g., metadata, images, audio) captured by the apparatus 200.

In one such exemplary embodiment, the electronic storage 204 may include non-transitory memory configured to store configuration information and/or processing code to capture, store, retrieve, and/or render, e.g., video information, metadata and/or to produce a multimedia stream including, e.g., a video track and metadata in accordance with the methodology of the present disclosure. In one or more implementations, the processing configuration may be further parameterized according to, without limitation: capture type (video, still images), image resolution, frame rate, hurst setting, white balance, recording configuration (e.g., loop mode), audio track configuration, and/or other parameters that may be associated with audio, video and/or metadata capture. Additional memory may be available for other hardware/firmware/software needs of the apparatus 200. The processor 202 may interface to the sensor controller module 200 in order to obtain and process sensory information for, e.g., object detection, face tracking, stereo vision, and/or other tasks.

In one exemplary embodiment, the electronic storage 204 may further include instructions which when executed by the processor 202 encode and/or decode images from multiple optics modules 206 that exploit content continuity between facets, such as in the case of encoding/decoding cube-projected images. In some such variants, one facet may be encoded/decoded independently from other facets to obtain a seed facet. Additional transformed versions of the seed facet may be generated according to known geometric relationships between the various facets of the optics modules 206; e.g., one corresponding to a 90° counterclockwise rotation, another to a 90° clockwise rotation, and one to an 180° rotation. Transformed versions may be used to form an augmented image. The remaining facets of the optics modules 206 may be encoded using transformed versions within the augmented image.

The apparatus 200 may include one or more optics modules 206. In one or more implementations, the optics module 206 may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component. In some implementations the optics module 206 may implement focus controller functionality configured to control the operation and configuration of the camera lens. The optics module 206 may receive light from an object and couple received light to an image sensor 208. The image sensor 208 may include, by way of non-limiting example, one or more of charge-coupled device sensor, active pixel sensor, complementary metal-oxide semiconductor sensor, N-type metal-oxide-semiconductor sensor, and/or other image sensor. The image sensor 208 may be configured to capture light waves gathered by the optics module 206 and to produce image(s) data based on control signals from the sensor controller module 210 (described below). The optics module 208 may include a focus controller configured to control the operation and configuration of the lens. The image sensor may be configured to generate a first output signal conveying first visual information regarding the object. The visual information may include, by way of non-limiting example, one or more of an image, a video, and/or other visual information. The optical element, and the first image sensor may be embodied in a housing.

In some implementations, the image sensor module 208 may include, without limitation, video sensors, audio sensors, capacitive sensors, radio sensors, accelerometers, vibrational sensors, ultrasonic sensors, infrared sensors, radar, LIDAR and/or sonars, and/or other sensory devices.

The apparatus 200 may include one or more audio components 212 e.g., microphone(s) and/or speaker(s). The microphone(s) may provide audio content information. Speakers may reproduce audio content information.

The apparatus 200 may include a sensor controller module 210. The sensor controller module 210 may be used to operate the image sensor 208. The sensor controller module 210 may receive image or video input from the image sensor 208; audio information from one or more microphones, such as 212. In some implementations, audio information may be encoded using audio coding format, e.g., AAC, AC 3, MP3, linear PCM, MPEG-H and or other audio coding format (audio codec). In one or more implementations of "surround" based experiential capture, multi-dimensional audio may complement e.g., panoramic or spherical video; for example, the audio codec may include a stereo and/or 3-dimensional audio codec.

The apparatus 200 may include one or more metadata modules 214 embodied within the housing and/or disposed externally to the apparatus. The processor 202 may interface to the sensor controller 210 and/or one or more metadata modules. Each metadata module 214 may include sensors such as an inertial measurement unit (IMU) including one or more accelerometers and/or gyroscopes, a magnetometer, a compass, a global positioning system (GPS) sensor, an altimeter, ambient light sensor, temperature sensor, and/or other environmental sensors. The apparatus 200 may contain one or more other metadata/telemetry sources, e.g., image sensor parameters, battery monitor, storage parameters, and/or other information related to camera operation and/or capture of content. Each metadata module 214 may obtain information related to environment of the capture device and an aspect in which the content is captured and/or to be rendered.

By way of a non-limiting example: (i) an accelerometer may provide device motion information, including velocity and/or acceleration vectors representative of motion of the apparatus 200; (ii) a gyroscope may provide orientation information describing the orientation of the apparatus 200; (iii) a GPS sensor may provide GPS coordinates, and time, that identify the location of the apparatus 200; and (iv) an altimeter may provide the altitude of the apparatus 200. In some implementations, the metadata module 214 may be rigidly coupled to the apparatus 200 housing such that any motion, orientation or change in location experienced by the apparatus 200 is also experienced by the metadata sensors 214. The sensor controller module 210 and/or processor 202 may be operable to synchronize various types of information received from the metadata sources 214. For example, timing information may be associated with the sensor data. Using the timing information metadata information may be related to content (photo/video) captured by the image sensor 208. In some implementations, the metadata capture may be decoupled from video/image capture. That is, metadata may be stored before, after, and in-between one or more video clips and/or images. In one or more implementations, the sensor controller module 210 and/or the processor 202 may perform operations on the received metadata to generate additional metadata information. For example, a microcontroller may integrate received acceleration information to determine a velocity profile of the apparatus 200 during the recording of a video. In some implementations, video information may consist of multiple frames of pixels using any applicable encoding method (e.g., H 262, H.264, Cineform® and/or other standard).

Embodiments of either the camera systems and/or hybrid reality viewers may interface with external interfaces to provide external metadata (e.g., GPS receivers, cycling computers, metadata pucks, and/or other devices configured to provide information related to the device and/or its environment) via a remote link. The remote link may interface to an external user interface device. In some implementations, the remote user interface device may correspond to a smart phone, a tablet computer, a phablet, a smart watch, a portable computer, and/or other device configured to receive user input and communicate information. Common examples of wireless link interfaces include, without limitation e.g., WiFi, Bluetooth (BT), cellular data link, Zig Bee, near field communications (NFC) link, ANT+link, and/or other wireless communications link. Common examples of a wired interface include without limitation e.g., HDMI, USB, DVI, DisplayPort, Ethernet, Thunderbolt, and/or other wired communications links.

The user interface device may operate a software application (e.g., GoPro Studio, GoPro App, and/or other software applications) configured to perform a variety of operations related to camera configuration, control of video acquisition, and/or display of video. For example, some applications (e.g., GoPro App) may enable a user to create short video clips and share clips to a cloud service (e.g., Instagram, Facebook, YouTube, Dropbox); perform full remote control of the device, preview video being captured for shot framing, mark key moments while recording (e.g., with HiLight Tag), view key moments (e.g., View HiLight Tags in GoPro Camera Roll) for location and/or playback of video highlights, control device software, and/or perform other functions.

The apparatus 200 may also include user interface (UI) module 216. The UI module 216 may include any type of device capable of registering inputs from and/or communicating outputs to a user. These may include, without limitation, display, touch, proximity sensitive interface, light, sound receiving/emitting devices, wired/wireless input devices and/or other devices. The UI module 216 may include a display, one or more tactile elements (e.g., buttons and/or virtual touch screen buttons), lights (light emitting diode (LED)), speaker, and/or other UI elements. The UI module 216 may be operable to receive user input and/or provide information to a user related to operation of the apparatus 200.

In one exemplary embodiment, the UI module 216 is a head mounted display (HMD). HMDs may also include one (monocular) or two (binocular) display components which are mounted to a helmet, glasses, or other wearable article, such that the display component(s) are aligned to the users eyes. In some cases, the HMD may also include one or more cameras, speakers, microphones, and/or tactile feedback (vibrators, rumble pads). Generally, HMD are configured to provide an immersive user experience within a virtual reality, augmented reality, or modulated reality. Various other wearable UI apparatuses (e.g., wrist mounted, shoulder mounted, hip mounted, etc.) are readily appreciated by artisans of ordinary skill in the related arts, the foregoing being purely illustrative.

In one such variant, the one or more display components are configured to receive faceted image content and exploit the image content continuity between facets for display. For example, a seed facet may be decoded first and transformed according to various rotations (e.g., a 90° counterclockwise rotation, another to a 90° clockwise rotation, and an 1800 rotation). The transformed versions may be used to assist in decoding the remaining facets of the image. The facets may then be stitched and/or projected together to obtain a full panoramic view or other wide field of view.

The I/O interface module 218 of the apparatus 200 may include one or more connections to external computerized devices to allow for, inter alia, content delivery and/or management of the apparatus 200. The connections may include any of the wireless or wireline interfaces discussed above, and further may include customized or proprietary connections for specific applications. In some implementations, the communications interface may include a component (e.g., a dongle), including an infrared sensor, a radio frequency antenna, ultrasonic transducer, and/or other communications interfaces. In one or more implementation, the communications interface may include a local (e.g., Bluetooth, Wi-Fi) and/or broad range (e.g., cellular LTE) communications interface configured to enable communications between the apparatus 200 and an external content source (e.g., a content delivery network).

The apparatus 200 may include a power system that may be tailored to the needs of the application of the device. For example, for a small-sized lower power action camera, a wireless power solution (e.g. battery, solar cell, inductive (contactless) power source, and/or other power systems.) may be used.

Figure 3:
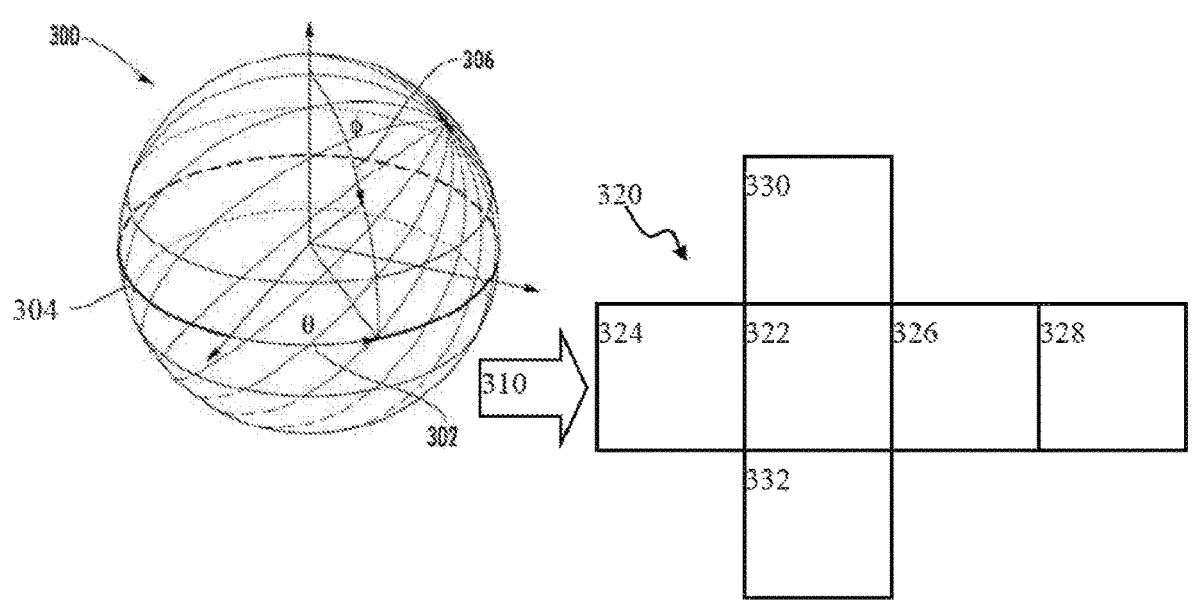
FIG. 3 is a graphical illustration depicting spherical to cube image projection, in accordance with one implementation.

FIG. 3 illustrates spherical coordinate system 300 useful for characterizing image transformation of the disclosure in accordance with one implementation. Spherical angle 8, denoted by arrow 302 in FIG. 3 may be used to denote location of a pixel along the iso-line 304 in FIG. 3. Spherical angle cp, denoted by arrow 306 in FIG. 3 may be used to denote a location away from the equator 304. It will be appreciated that while the exemplary implementation(s) described herein are discussed in terms of a spherical coordinate system, other coordinate systems may be utilized consistent with the disclosure for certain functions, including without limitation Cartesian, polar, and cylindrical coordinate systems.

In some implementations, a representation of the environment may be mapped into a cube projection 320. Same projections may include spherical to cube mapping denoted by arrow 310 in FIG. 3. In one or more implementations, the cube projection may be obtained by, e.g., assigning the output of individual cameras of apparatus 110 of FIG. 1 to a respective facet of projection 320. By way of an illustration, the output of forward looking camera 102 may be assigned to facet 322, the output of upward looking camera 116 may be assigned to facet 330, the output of camera 104 to facet 326, the output of other cameras of the apparatus 130 may be assigned to respective facets 324, 328, 332.

Figure 4A:
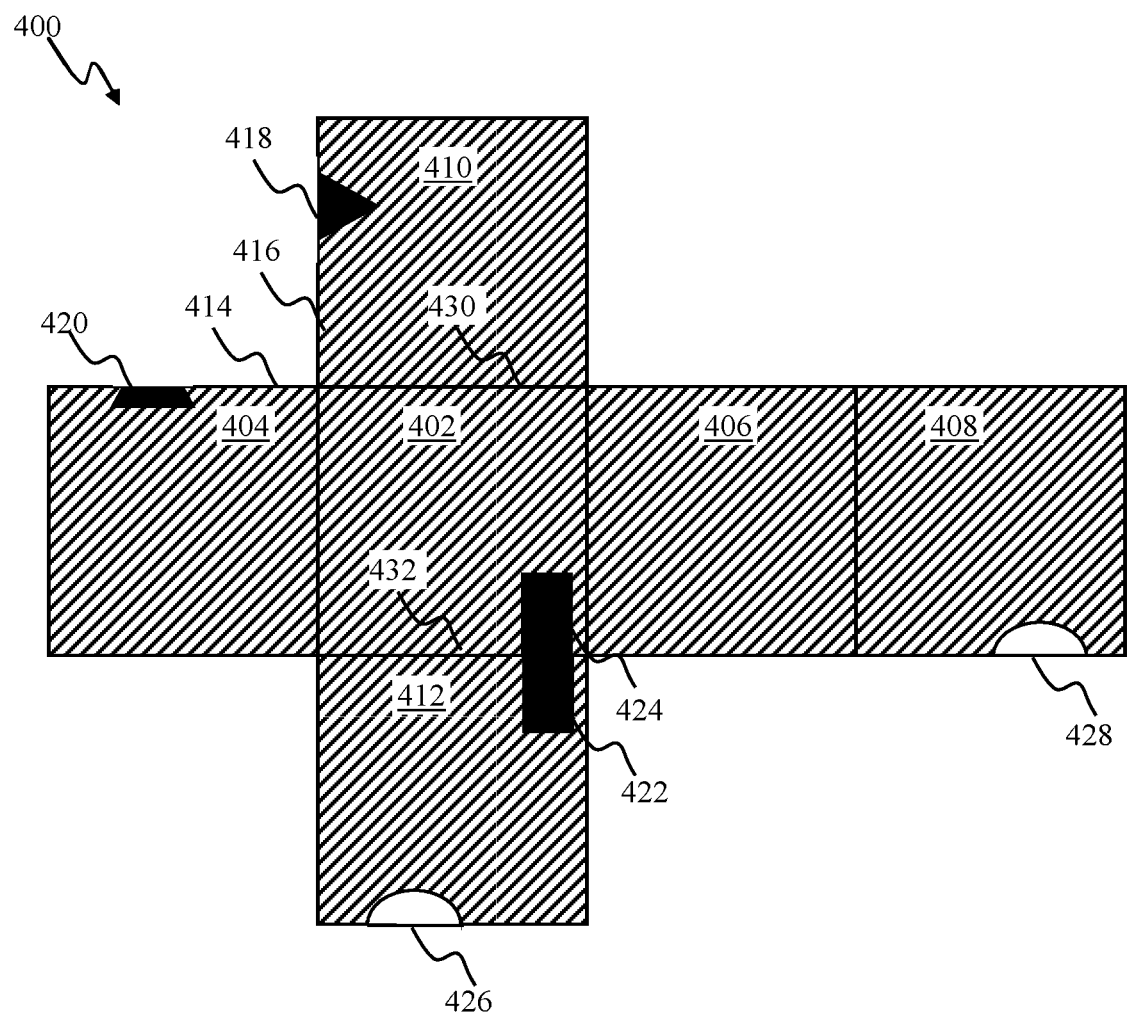
FIG. 4A is a graphical illustration depicting an exemplary cube projection of a panoramic image for use with encoding methodology of the disclosure, in accordance with one implementation.

In some implementations, cube projection of visual environment may be obtained in accordance with configuration of FIG. 4A, wherein the top facet (e.g., upward looking view) may be placed at the top of the projection (e.g., facet 410 in FIG. 4A). In one or more implementations, the up view may be placed in the middle facet. Other implementations may place the up view on a particular side facet. Still other orientations and views may be used consistent with the various principles described herein, the foregoing being purely illustrative.

FIGS. 5A-5C illustrate several exemplary facet packing arrangements of cubic projection configurations for use with the encoding methodology of the disclosure, in accordance with one implementation. As shown in FIG. 5A, a cube projection of the visual environment may include: a top facet 502, a bottom facet 504, and four (4) side facets (facet A 506, facet B 505, facet C 510, facet D 512). The arrangement of these facets may be arranged in any number of mappings (of which two (2) are shown). Under a first mapping, the top facet (e.g., upward looking view) is placed at the top of the projection. Under a second mapping, the top facet may be placed in the middle. While other mappings may be used, the identified mappings are described for various encoding efficiency improvements. In particular, when the cubic projection is encoded within the equirectangular format (e.g., under HEVC H.264 encodings), the facet mapping may affect encoding efficiencies. It will be recognized by those skilled in the arts that various other configurations of cube projection may be utilized consistent with the present disclosure. An encoder may be configured to adaptively select a given facet packing configuration for a given frame (image), for GOP, and/or a sequence of frames (images) corresponding to a given scene. For example, in other use scenarios, a top facet may not be the primary view of interest (e.g., a blue sky, a ceiling, etc.), and a forward facing camera may be preferred.

Figure 8A:
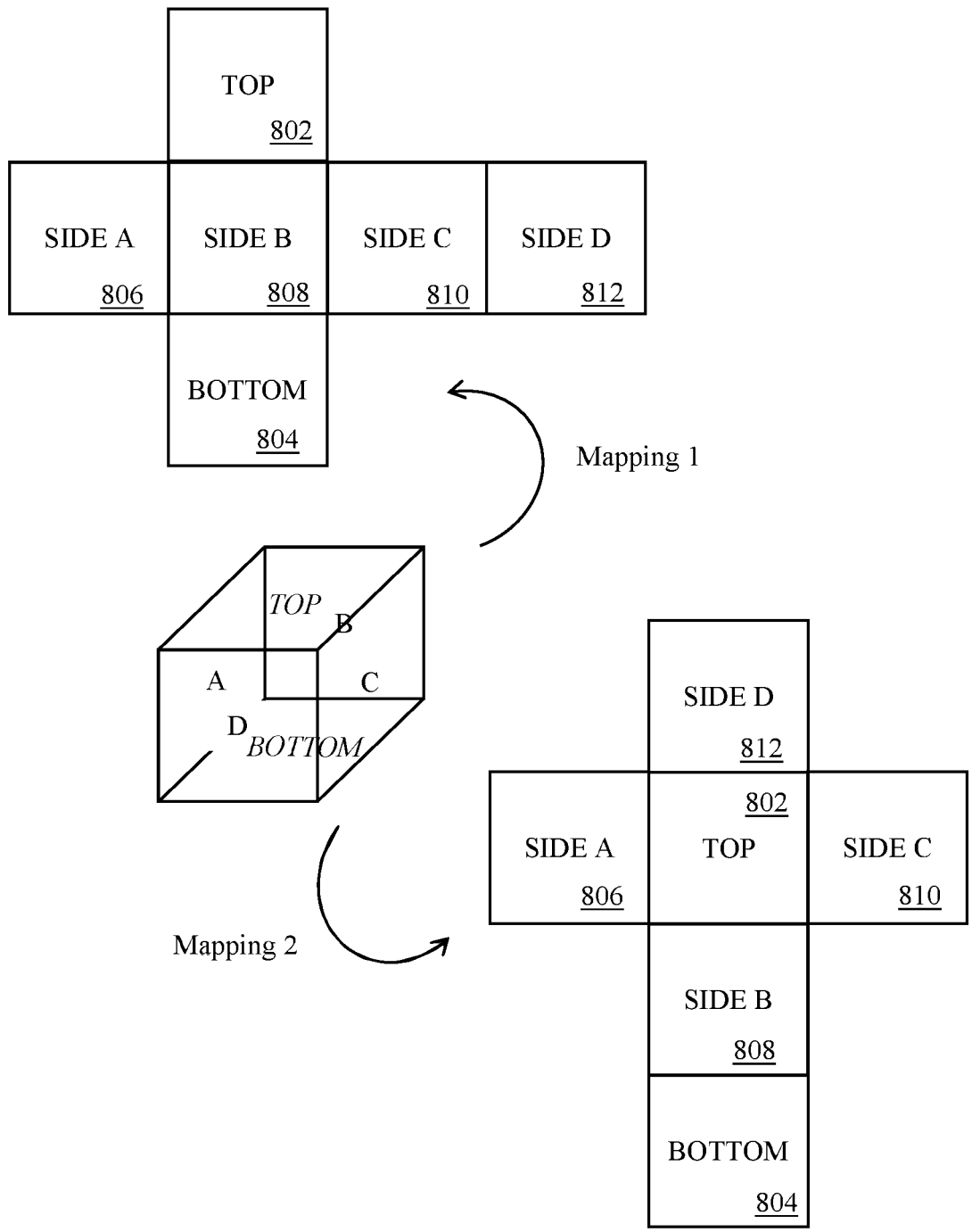
FIGS. 8A-8C are graphical illustrations depicting exemplary frame packing arrangements in cubic projection configurations for use with encoding methodology of the disclosure, in accordance with one implementation.
Figure 8B:
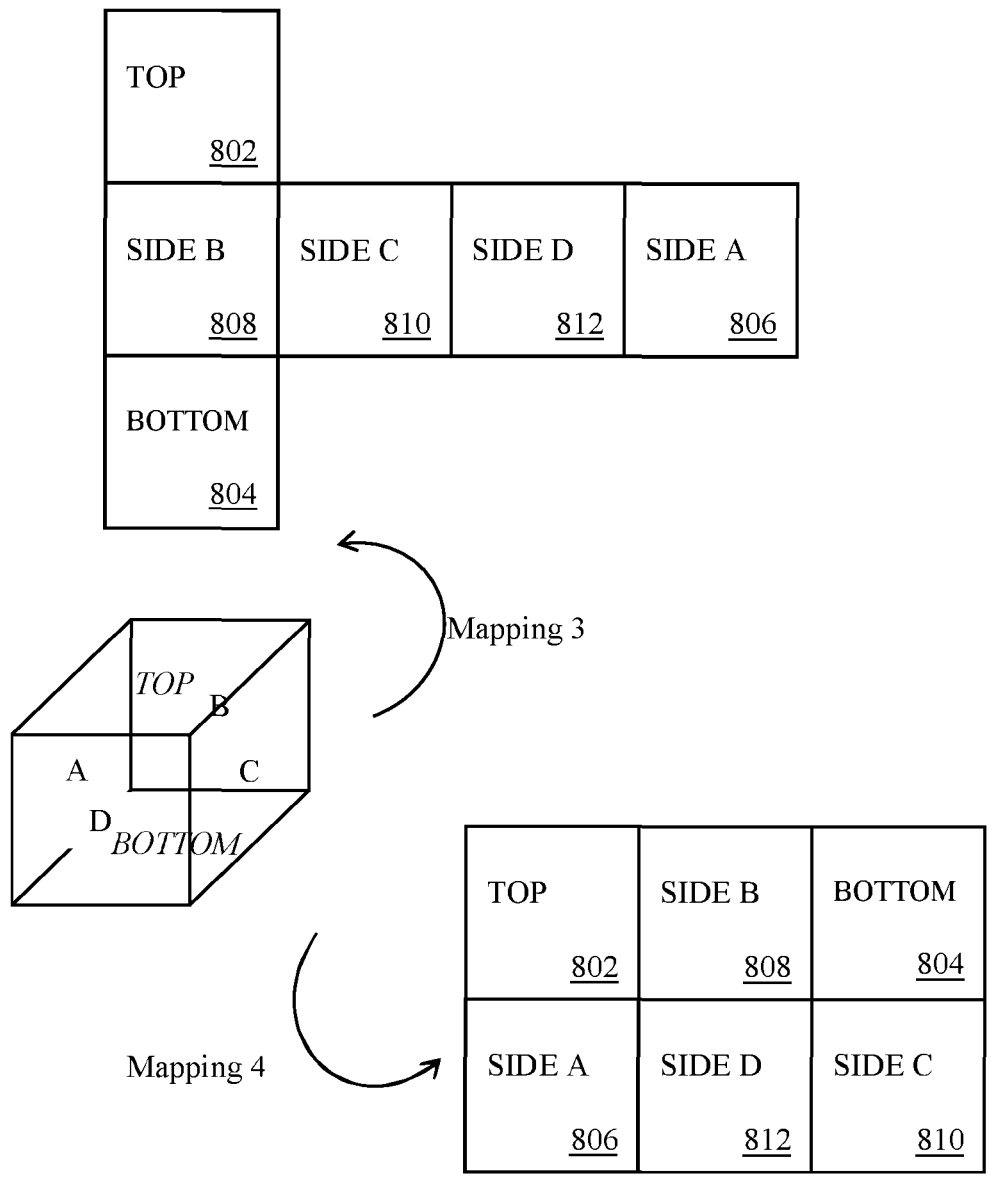

As shown in FIG. 8B, facets of the cube projection may be configured using a third mapping in a T configuration wherein facets 802, 808, 804 may be configured in a column so as to provide scene continuity across boundaries (e.g., horizontal boundary between the facet 802, and 808; and horizontal boundary between the facet 808 and 804). Such scene continuity may facilitate intra-frame prediction and/or provide for greater encoding efficiency and/or lower encoded bitrate when encoding facets 802, 808, 804 using e.g., H.264, HEVC, and/or other encoder configured for intra-frame prediction. Facets 810, 812, 806 may be configured in a row such that to provide visual scene continuity across boundaries (e.g., vertical boundary between the facet 810, and 812; and vertical boundary between the facet 812 and 806). The column/row T-shaped configuration of FIG. 8B may further provide for visual scene continuity across a vertical boundary between the facet 808, and 810. Such scene continuity may facilitate intra-frame prediction and/or provide for greater encoding efficiency and/or lower encoded bitrate when encoding facets 810, 812, 806 using e.g., H.264, HEVC, and/or other encoder configured for intra-frame prediction.

As shown in FIG. 8B, facets of the cube projection may be configured in a 3×2 configuration using a fourth mapping. As used herein when describing facet packing, the first index (3) may denote number of columns (or rows); the second index (2 in FIG. 8B) may denote number of rows/columns. The 3×2 configuration may correspond to rows of facets including facets 802, 808, 804 and a row including facets 806, 812, 810. Configuring facets in rows may provide for scene continuity across vertical facet boundaries (e.g., boundaries between the facet 802 and facet 808, facet 808 and facet 804; facet 806 and facet 812 and facet 812 and facet 810. It is noteworthy that visual scene discontinuity may occur between facets of different rows, e.g., across row boundary 824. The 3×2 facet configuration obtained using the fourth mapping may provide for efficient memory utilization when packing, encoding, storing, and/or transmitting cube mage projection.

Figure 8C:
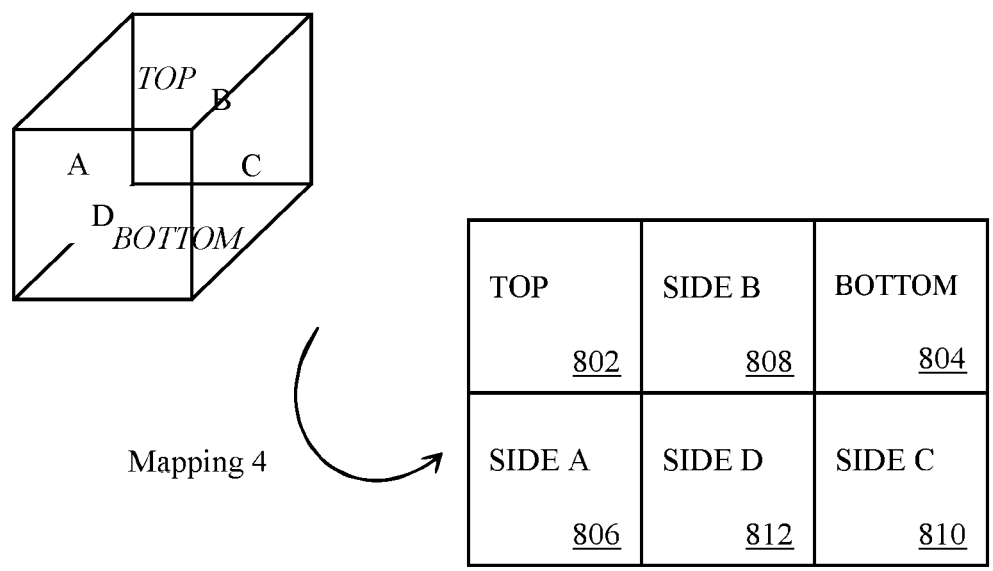

The row-wise 3×2 facet packing configuration of FIG. 8B may be augmented. As shown in FIG. 8C, one or more rows and/or columns may be added to obtain 4×2, 5×2, 3×3, 4×4, 4×3, 5×3, 4×4, 5×4 and/or other packing configurations. By way of an illustration, the facet 808 may be disposed to the left of facet 808 to provide visual scene continuity across the vertical boundary and facilitate intra-frame encoding of the facet 806. Facet 804 may be disposed below facet 808 to provide visual scene continuity across the horizontal boundary and facilitate intra-frame encoding of the facet 806. A facet (e.g., 812) may be disposed above facet 802 to provide visual scene continuity across the horizontal boundary and facilitate intra-frame encoding of the facet 802. An encoder may be configured to adaptively select facet packing configuration (e.g., such as described herein) for a given frame (image), for GOP, and/or a sequence of frames (images) corresponding to a given scene.

FIG. 4A presents an exemplary encoding/decoding of cube-projected images using the methodology of the disclosure to exploit content continuity between cube facets. One facet may be encoded/decoded independently from other facets to obtain a seed facet. One or more transformed versions of the seed facet may be obtained, e.g., via a 90° counterclockwise rotation, via a 90° clockwise rotation, and via a 150° rotation. Transformed versions of the seed facet or previously encoded/decoded facets may be used to form an augmented image. The remaining facets of the cube may then be encoded/decoded using this augmented image. Continuity across one or more boundaries between the transformed facets (within the augmented image) and the currently encoded/decoded facets may be utilized, such as to obtain greater compression efficiency (as opposed to encoding of individual facets independently from one another). This increased compression efficiency may be attributed to intra-prediction or motion prediction across cube boundaries.

Moreover, since the cameras are fixed relative to one another, they also have fixed fields of view and fixed perspective distortions. In some embodiments, the stitching algorithms or logic can model the fixed fields of view with known perspective distortions. For example, consider a rod that runs transverse to an object camera face, the rod extends into the field of view of a neighboring camera face oriented perpendicular to the object camera. The neighbor camera will perceive the rod extending toward its so-called "vanishing point". The perspective distortion is a static relationship that can be modelled with a fixed linear transformation (e.g., rather than re-calculating the stitching distortions anew with every subsequent image). This technique may be used with any optic lens types with equivalent success (e.g., fisheye, macro, zoom, telephoto, achromatic, apochromatic, process, wide-angle, ultra-wide-angle, and/or any other lens type).

FIGS. 4A-SB illustrate an encoding of panoramic images, in accordance with some implementations.

Panel 400 in FIG. 4A presents a planar configuration of a cube projection of three-dimensional (3D) environment. Artisans of ordinary skill in the related arts will readily appreciate that the cube projection is only provided as one illustrative example. The various principles described herein apply to other projection shapes and solids including without limitation polyhedrons (e.g., tetrahedrons, dodecahedrons, etc.), truncated icosahedrons, and pyramidal shapes.

The projection 400 may include up to 6 facets (e.g., 404, 402, 406, 408, 410, 412). In one implementation, the facets 404, 402, 406, 408, 410, 412 may correspond to front, left, right, back, up, down quadrants of 3D space. Individual facets may include representations of one or more objects (e.g., a triangle 418, 420, a rectangle 422, 424, an ellipse 426, 428). When arranged in a planar configuration (e.g., such as shown in FIG. 4A) transitions across boundaries between one or more facets may be continuous (e.g., boundary 430 between facets 410 and 402); transitions across one or more boundaries may appear discontinuous (e.g., boundaries 414, 416).

Figure 4B:
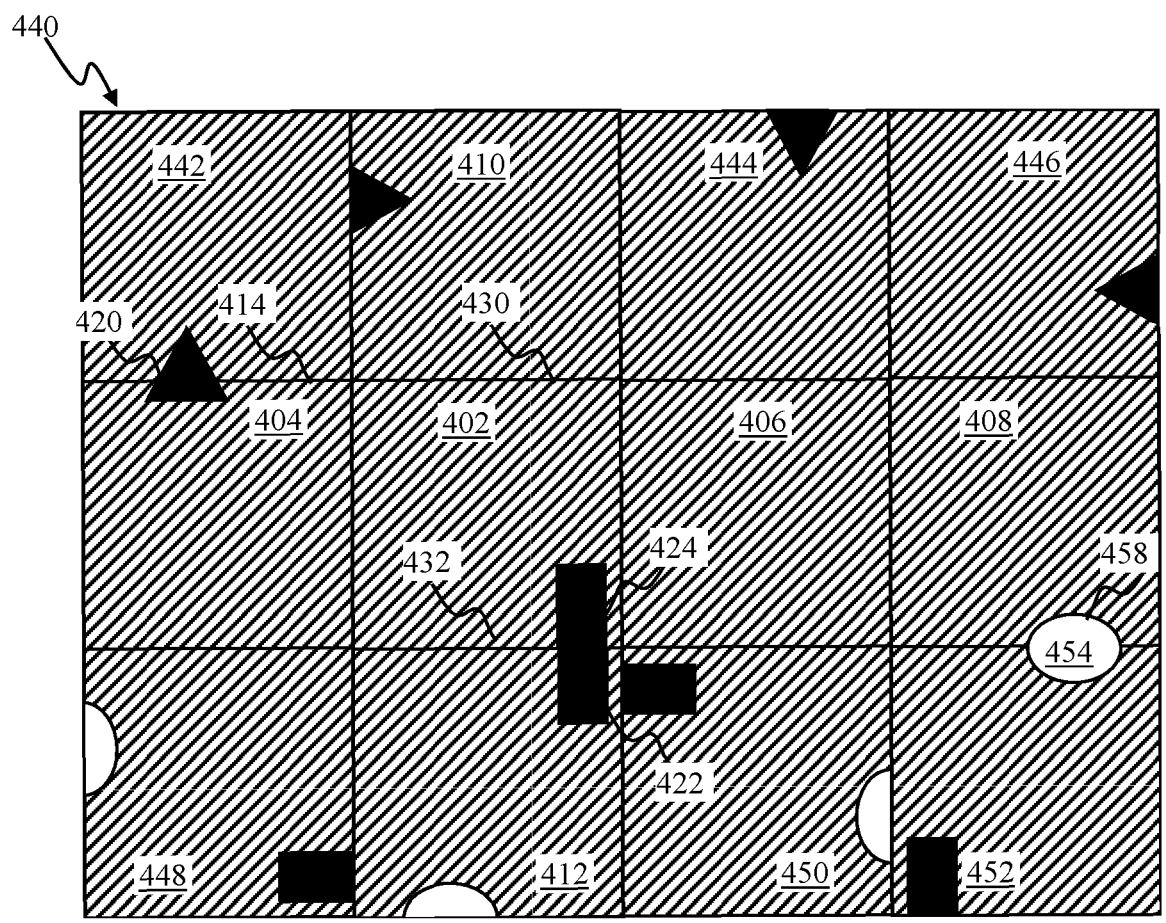
FIG. 4B is a graphical illustration depicting an exemplary augmented image obtained on components of the cube projection of FIG. 4A, in accordance with one implementation.

FIG. 4B illustrates one exemplary configuration of encoding an image obtained from facets of the cube projection, e.g., projection 400 shown in of FIG. 4A. The image 440 of FIG. 4B may include the facets 404, 402, 406, 408, 410, 412 shown in FIG. 4A.

In accordance with methodology of the present disclosure, encoding of a (cube) projection image may include (i) obtaining an augmented image based on transforming previously encoded/decoded facets of the projection and (ii) encoding the current facet from this augmented image. In some implementations, the augmented image may be the same as the reconstructed or decoded images that the encoder and/or decoder may maintain.

In some implementations, encoding of the image 440 (e.g., using some existing codecs such as H.264, H.265) may be performed as follows. An image portion (facet) may be encoded independent from other portions of the image. Encoding may be configured using any applicable codec (e.g., H.264, H.265, HEVC, and/or other codec). Macroblocks or coding units of the facet 410 may be coded in raster scan order.

By way of an illustration of encoding the image 440, a facet 410 may be encoded independent from other portions of the image (other facets). The encoded version of the facet 410 may be transformed to obtain transformed portions. The transformation may include rotation, flipping (horizontally or vertically), translation, and/or scaling operations. By way of an illustration of FIG. 4B, the encoded facet 410 may be rotated 90° counterclockwise, and translated left to obtain facet 442; the encoded facet 410 may be rotated 90° clockwise, and translated right to obtain facet 444; the encoded facet 410 may be rotated 180° clockwise/or counterclockwise, and translated right to obtain facet 446.

Image facets 404, 402, 406, 408 may be encoded using any applicable codec. In some implementations, facets 404, 402, 406, 408 may be encoded using e.g., H.264, HEVC, and/or other codec that is configured to effectuate motion prediction in top-to-bottom and left-to-right directions. By way of an illustration, when encoding the facet 404, motion and/or other characteristics of pixels of the facet 404 below the boundary 414 may be predicted from pixels of the facet 442 above the boundary 414.

Encoding of the image 440 may further include encoding the facet 412. Encoding of the facet 412 may be effectuated using any applicable codec (e.g., H.264, H.265, HEVC, and/or other codec) wherein macroblocks or coding units of the facet 412 may be coded in raster scan order. The facet 412 may be encoded using encoding information (e.g., motion vectors) of the facet 402. Encoded version of the facet 412 may be transformed to obtain transformed portions. The transformation may include rotation, translation, and/or scaling operations. By way of an illustration of FIG. 4B, the encoded facet 412 may be rotated 90° counterclockwise, and translated left to obtain facet 448; the encoded facet 412 may be rotated 90° clockwise, and translated right to obtain facet 450; the encoded facet 412 may be rotated 180° clockwise/or counterclockwise, and translated right to obtain facet 452.

It is noteworthy, that in the image 440, the facets 442, 444, 446, 448, 450, 452 may not be encoded/decoded, and neither may they be required to be transmitted in a bitstream. They are obtained using any transformation operation (e.g., rotation, translation or scaling) of previously encoded/decoded facets. Typically, image rotation, and/or translation may be performed efficiently using a GPU or CPU. Use of such image transformation to obtain portions 442, 444, 446, 448, 450, 452 advantageously may use fewer computational and/or energy resources, and may result in fewer bits transmitted when compared to encoding/decoding portions 442, 444, 446, 448, 450, 452 as if they were part of the image.

The encoder may signal (and decoder may receive) one or more flags indicating a transformation operation for each facet to fill the augmented image. The transformation operation could be signaled, as but a few examples, per sequence, per picture, or per facet. The encoder could also choose to pick a most optimal transformation per facet that achieves one or more criteria of interest; e.g., that which minimizes bits or maximizes image quality of each facet.

The augmented (or reconstructed) image 440 may also be utilized as a reference image for future coded images. For this case, this augmented picture may be placed with or without transformation in a reference picture list. In some implementations, while encoding following frames, the encoder may choose to do motion estimation (and the decoder may do motion compensation) on this image.

Figure 4C:
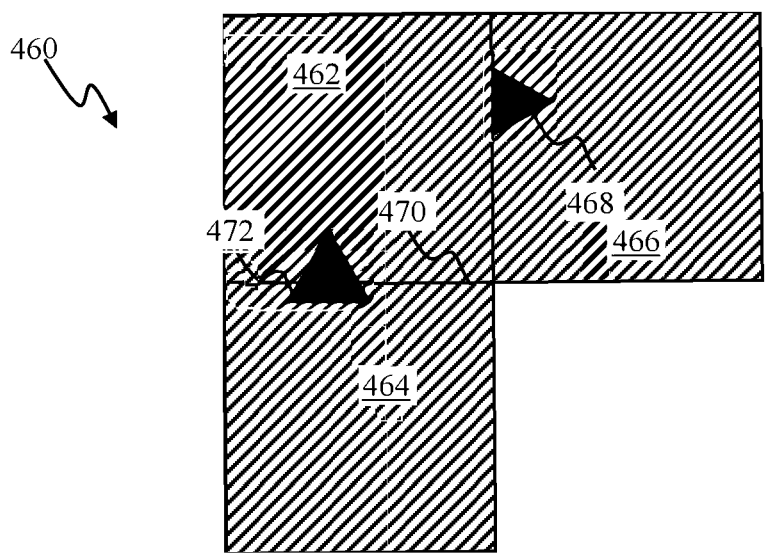
FIG. 4C is a graphical illustration depicting use of encoding methodology of the disclosure for encoding a portion of an image, in accordance with one implementation.

In some implementations, the methodology of the disclosure may be utilized for encoding a portion of a visual environment. FIG. 4C illustrates encoding of one image portion (e.g., the portion 464) using transformed version of another encoded image portion (e.g., portion 466). The portion 466 may be encoded independently using any applicable codec (e.g., HEVC) that may employ raster pixel scan order. The encoded version of the portion 466 may be rotated 90° counterclockwise and translated left to obtain the portion 462. Placing the transformed portion 462 above the portion 464 may provide for pixel continuity across the boundary 470. This is illustrated by continuity between representations of the triangle 468, 472 across the boundary 470. Use of transformed portion 462 of previously encoded block 466 may enable better intra-prediction because of the pixel continuity across the boundary 470. This will also allow better inter-prediction (when this picture is used as a reference) because an object moving up inside facet 464 will now be properly motion-estimated.

Figure 9A:
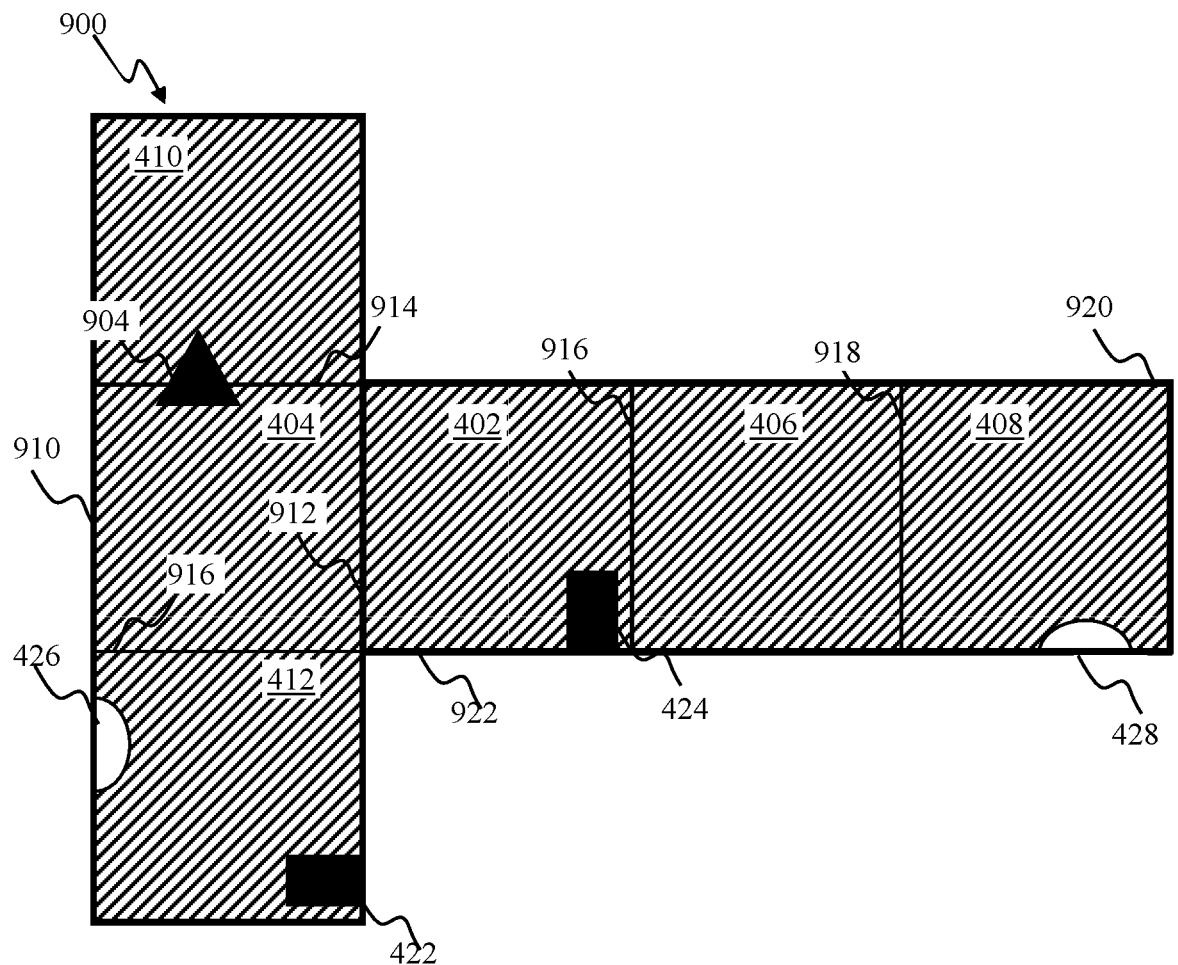
FIG. 9A is a graphical illustration depicting an exemplary cube projection configuration for encoding of a panoramic image for use with encoding methodology of the disclosure, in accordance with one implementation.

Facets of a cube projection may be configured using the pattern shown in FIG. 9A. Configuration 900 shown in FIG. 9A may include facets 402, 404, 406, 408, 410, 412, e.g., such as described with respect to FIG. 4A. Facet configuration 900 of FIG. 9A may be referred to as cube-4×3 wherein facets 410, 404, 412 may be configured in a column 910 (shown by bald line outline); facets 402, 406, 408 may be configured in a row 920 shown by bald line outline 920. It will be recognized by those skilled in the arts that various other column and/or row configurations may be utilized, e.g., such as a column including facets 410, 402, 412; a row including facets 406, 408, 404, and/or other configurations. The column 910 and the row 920 may share a boundary 912. Encoding of a panoramic image projected in accordance with the sideways T projection configuration (e.g., 900) using commonly available raster-order image encoding approaches (e.g., H.264, HEVC, H.265, and/or other encoders) may be performed as follows. In raster order encoder implementations, portions of an image may be encoded in left to right, top to bottom order. More directly, raster order codecs encode images according to a fixed "zig-zag" pattern (from left to right, top to bottom). Under a In alternative non-raster order implementations, facets of the column 910 may be encoded, as follows: facet 410 may be encoded as standalone portion (e.g., without using motion estimation from surrounding image portions); facet 404 may be encoded using prediction information across boundary 914 from encoded facet 410. Facet 412 may be encoded using prediction information across boundary 916 from encoded facet 404.

In one such implementation, the facets of the column 920 may be encoded as follows: facet 402 may be encoded using prediction information from encoded facet 404 across boundary 912; facet 406 may be encoded using prediction information from encoded facet 402 across boundary 916; facet 408 may be encoded using prediction information from encoded facet 406 across boundary 918.

In some implementations, projection configuration (e.g., partitioning 3D environment into facets of a cube, e.g., such as shown in FIG. 4A, and/or FIG. 9A) may be configured based on content (e.g., an object, a person, a feature (e.g., horizon), and/or other feature) within one or more facets.

Figure 9B:
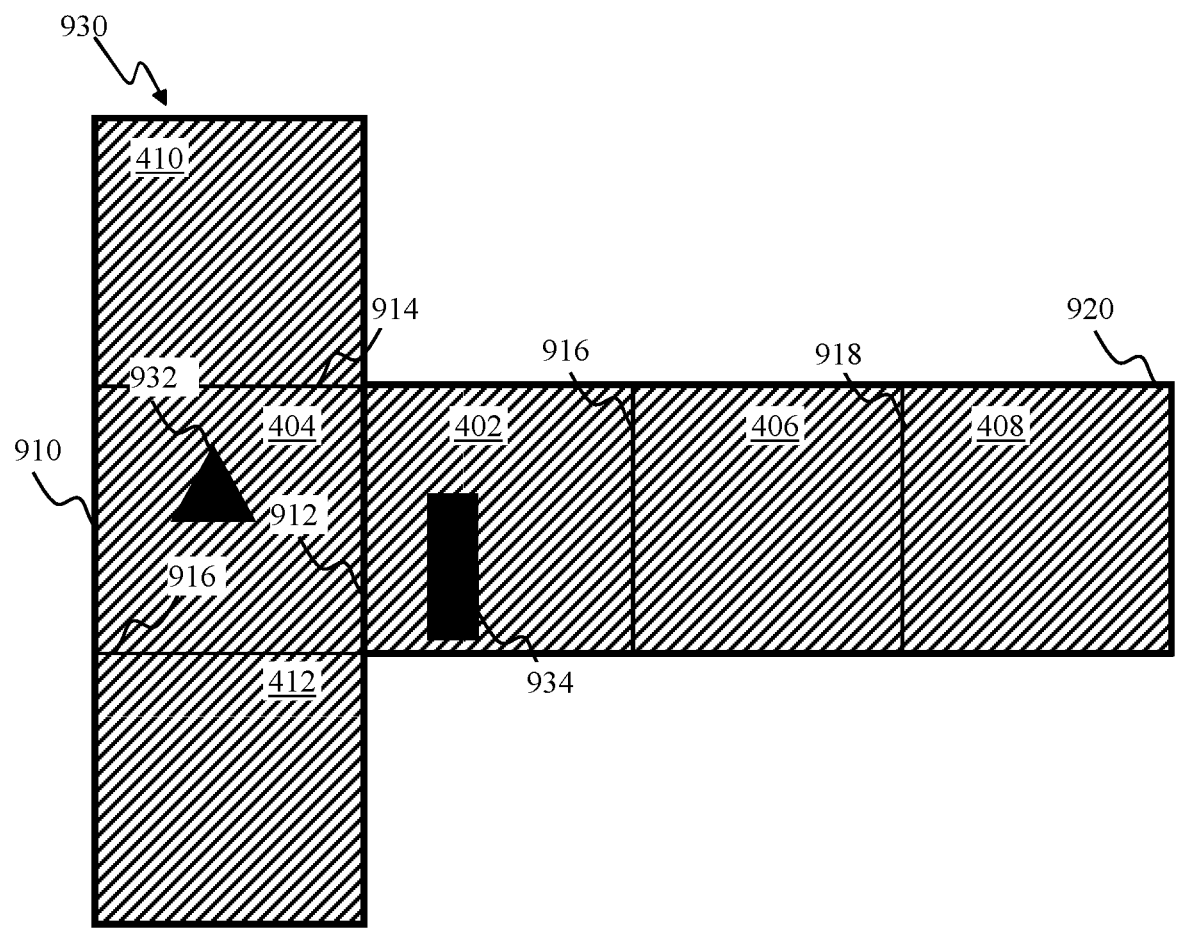
FIG. 9B is a graphical illustration depicting an exemplary cube projection configuration based on content for encoding of a panoramic image for use with encoding methodology of the disclosure, in accordance with one implementation.

FIG. 9B illustrates one exemplary cube facet configuration 930 configured based on content within one or more facets. For example, in some cases, a cube projection may be logically overlaid on e.g., a dual-lens setup. In some variants, the dual-lens setup may stitch the full panorama before performing the logical overlay into a cubic projection. The logical overlay selectively partitions the hemisphere according to e.g., image quality, and/or other processing considerations. For example, as shown in FIG. 9B, cube facet boundaries may be selected such that representation of an object (e.g., triangle 932 and/or rectangle 934) may be within a given facet (e.g., 404, 402, respectively). Placing an object within a given facet may result in better encoding performance (e.g., as judged based on a combination of lower encoding time, greater encoded quality, lower number of bits) when encoding; e.g., the contents of the facet 404 in FIG. 9B, as compared to encoding contents of facets 402, 412 in FIG. 9A containing representations 922, 924 of the rectangle that cross facet boundary 922. Encoding of an object and/or a feature that may be disposed within a facet may advantageously produce fewer artifacts for given configuration of encoding parameters (e.g., macroblock, QP, bitrate, and/or other parameters).

In some implementations, facet boundary determination may be performed adaptively when a camera is in motion and/or an object is in motion with respect to the camera (or both).

Image partitioning and/or encoding methodology e.g., such as described with respect to FIGS. 4A-10C may be utilized with a variety of capture device configurations e.g., single wide angle lens (e.g., with FOV greater than 120°) camera, dual-lens camera (e.g., cameras that are mounted in a back-to-back configuration (also commonly referred to as a "Janus" configuration); six lens capture apparatus (e.g., 110 of FIG. 1), and or other camera configurations. By way of an illustration of encoding images obtained with a dual-lens camera. In some implementations, source images (e.g., front/back) may be stitched to obtain spherical image. Content of the spherical image may be analyzed in order to detect presence and/or position of one or more objects. A cube projection mapping (e.g. location of boundaries 912, 914, 916 of facets in FIG. 9B) may be configured based on object presence and/or location in the spherical image. Spherical images may be projected onto the cube mapping. Cube projections may be encoded using HEVC and/or other codecs. Encoded bitstreams for one or more facets of the cube projection may be stored and/or delivered for viewing. Received bitstreams may be decoded by e.g., a user interface device 120 and presented. In some implementations, stitching operations may be performed after decoding. When viewing content on a viewport that may be disposed away from lens boundaries (e.g., straight ahead in a dual front/back lens capture configuration) the stitching operation may be altogether omitted.

Figure 10A:
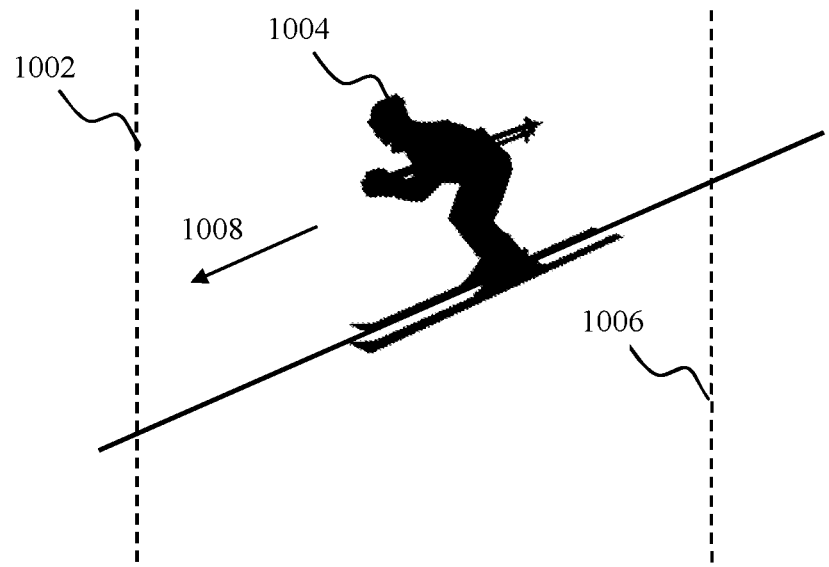
FIGS. 10A-10C illustrate facet boundary adjustment based on content for use with cube projection of panoramic content, in accordance with some implementations of encoding methodology of the disclosure.
Figure 10B:
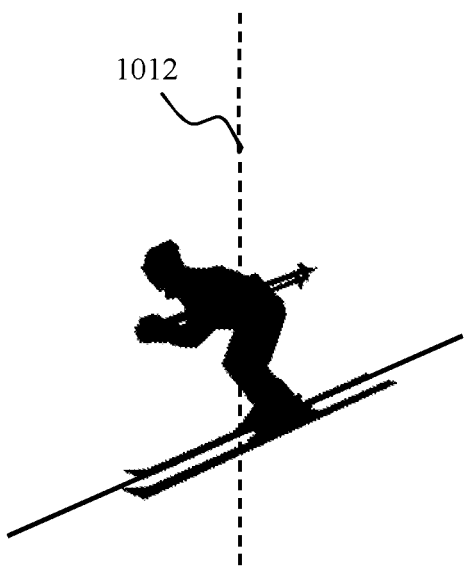
Figure 10C:
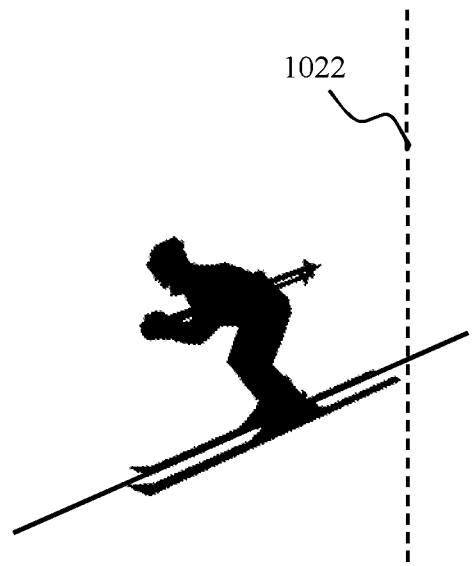

FIGS. 10A-10C illustrate adjustment of projection facet boundary based on content for use with cube projection of panoramic content, in accordance with some implementations of encoding methodology of the disclosure. FIG. 10A may represent a facet that may include a representation of a skier 1004 taken at time $t_1$ moving in a direction denoted by arrow 1008 along a mountain slope. Lines 1002, 1006 denote boundaries of the facet. FIG. 10B may represent contents taken at time $t_2 > t_1$. Line 1012 may represent a facet boundary. As may be seen from FIG. 10B, the facet boundary may fall through an object/skier. Encoding the skier across a facet boundary may produce encoding artifacts. Using skier motion information (e.g., obtained by object tracking using images of the video) and/or camera motion information (obtained using, e.g., camera motion sensor such as INU) the facet of the projection may be positioned such as not to slice across an object of interest, e.g., the skier. FIG. 10C illustrates adaptively placing a facet boundary at location 1022. Additionally, an overlap region can be used to detect parallax and as a result, a relative distance of objects from the camera. By using this distance information, the facets of a projection can be positioned such that they lie on objects that are farthest from the camera (and not moving).

Although cube projection has been used to illustrate encoding of panoramic images, applications of the present disclosure are not so limited and other multifaceted projections of a spherical image may be used. In some implementations, facets of a tetrahedron, octahedron, icosahedron and/or other polyhedron projection may be arranged such as to minimize across facet pixel discontinuity, e.g., using methodology described herein. By way of an illustration, one or more triangular facets of tetrahedron, octahedron, or icosahedron may be rotated by 120° in order to reduce object discontinuity across facets. It will be appreciated by those skilled in the arts that other projection configurations may be utilized with the methodology described herein, such as tetrahedral, rectangular pyramid, and/or other polyhedron projections that may include two or more facets.

The image encoding methodology described herein may, inter alia, enable better inter- and/or intra-motion estimation as compared to existing solutions. Same existing image encoding methods (codecs) e.g., H.264, H.265, HEVC may utilize a block-based encoding approach. Block-based codecs may operate in raster scan order; encoding of an image frame and/or image portion may begin with encoding of with top-left macroblock, and proceed in zig-zag fashion until reaching a bottom-right corner. FIGS. 5A-5B illustrate image encoding using block coding. When encoding a block in a middle row of image 500 of FIG. 5A (e.g. block C☐) information for blocks that lie above and/or to the left may be available. By way of an illustration, when encoding block C☐ motion and pixel information for block B☐, A☐ nd/or ☐ ☐ may be utilized to obtain higher compression as opposed to encoding block C☐ independent from other blocks. In some implementations, information from block ☐ ☐ may also be available while encoding block C☐

FIG. 5B illustrates an exemplary "inter mode" image encoding using methodology of the disclosure. In video compression (encoding) arts, the term inter prediction, inter frame prediction, and/or inter compression mode refers to compressing a frame in a video stream using information from one or more previously encoded/decoded frames (called reference frames). An encoder may choose to use only one reference frame which is used to predict the next frame (referred to as a "predicted" (P) frame) or it may choose to use two reference frames (before and after) that are used to predict the intermediary frame (referred to as a "bi-directionally predicted" (B) frame). Various aspects of the present disclosure apply to both P and B frame encoding methodologies. The data that may be used from reference frames may include (but is not limited to) pixels, motion vectors, or transform sizes.

When encoding an image using inter mode, a reference frame may include one or more portions of the panoramic image (e.g., portions 442, 410, 444, 446, 404, 402, 406, 408, 448, 412, 450, 452 of FIG. 4B and/or portions denoted with letters in FIG. 5B). The availability of pixels in the portions of the reference image may be due to previous decoding of the reference image; e.g., where a previously decoded reference frame was cached for such operation.

Various configurations of the reference frame for inter mode compression may be utilized, such as the configuration 520 of FIG. 5B, a configuration (not shown) wherein portions of the right most column of image 520 (e.g., denoted 522) may be duplicated and appended to the left of the frame 520, and/or other configurations. For inter frame coding, an encoder may search through one or more configurations and select a configuration based on a target performance metric (e.g., encoding time, compression efficiency or image quality).

FIG. 5C illustrates configuration for inter mode image compression methodology, in accordance with one implementation. Comparing configuration 540 of FIG. 5C and configuration 520 of FIG. 5B, it may be observed that configuration 540 may be obtained from configuration 520 by appending elements of column 522 to the left of the array 520 and elements of column 524 to the right of the array 520. The configuration shown in FIG. 5C may enable utilization of continuity (e.g., color, motion) in order to obtain better prediction and/or higher compression when encoding configuration 540 compared to encoding to encoding configuration 520.

Figure 6:
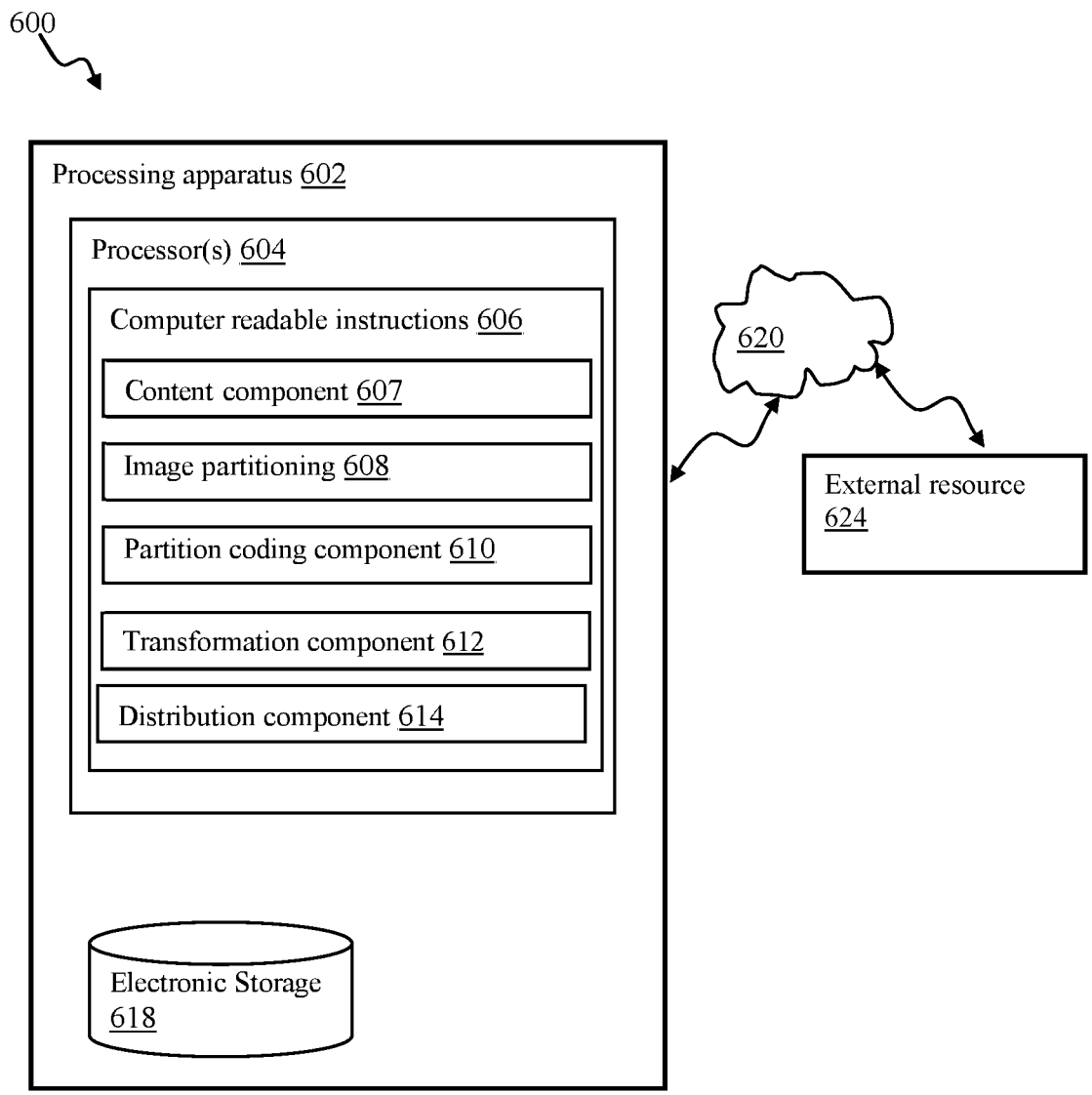
FIG. 6 is a functional block diagram illustrating a system for providing content using compression methodology of the disclosure, in accordance with one implementation.

FIG. 6 illustrates a computerized system for encoding and/or decoding of imaging content using methodology of the disclosure, in accordance with one implementation. In some implementations, the system 600 may be configured to provide encoded content during content acquisition by a capture device (e.g., 110 of FIG. 1). In one or more implementations, the system 600 may be configured to encode previously acquired content.

The system 600 of FIG. 6 may include a processing apparatus 602 (e.g., including capture device 110 of FIG. 1, 130 of FIG. 2, a computing device in communications with a capture device and/or content depository, a cloud computing apparatus, and/or other apparatus) configured to obtain audio and/or imaging content, e.g., video and/or photos. Content depository may include a network attached storage (NAS), a portable storage (e.g., flash memory), a cloud storage, a server, a personal computer, a DVR, and/or other storage configuration.

The processing apparatus 602 may be in operable communication with one or more remote client devices via one or more data communication interfaces which are coupled to a network 620. The one or more data communication interfaces in communications with the network 620 may include one or more wired interfaces (e.g., serial, USB, Thunderbolt™, HDMI, Ethernet, and/or other wired interfaces) and/or wireless interfaces (e.g., Wi-Fi, Bluetooth, cellular, and/or other interfaces). For example, such electronic communication links may be established, at least in part, via one or more networks. In some implementations, the network 620 may comprise the Internet and/or may employ other communications technologies and/or protocols. By way of non-limiting example, the interface may employ communication technologies including one or more of Ethernet, 802.11, worldwide interoperability for microwave access (WiMAX), 3G, Lang Term Evolution (LTE), digital subscriber line (DSL), asynchronous transfer mode (ATM), InfiniBand, PCI Express Advanced Switching, and/or other communication technologies. By way of non-limiting example, the interface may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over the interface may be represented using formats including one or more of hypertext markup language (HTML), extensible markup language (XML), and/or other formats. One or more exchanges of information between entities of system 600 may be encrypted using encryption technologies including one or more of secure sockets layer (SSL), transport layer security (TLS), virtual private networks (VPNs), Internet Protocol security (IPsec), and/or other encryption technologies. In some implementations, one or more entities of system 600 may use custom and/or dedicated data communications technologies instead of, or in addition to, the ones described above.

The processing apparatus 602 may communicate with (e.g., provide content to) a remote entity. The remote entity may include a user interface device, one or more of a portable communications device (e.g., smartphone, a tablet computer, a laptop computer), a desktop computer, a television set-top box, smart TV, a gaming console, a client computing platform, and/or other platforms), a server, a cable television network node, a cellular data network node, and/or other entity configured to communicate information with the apparatus 602. In some implementations, the system 600 may interface with one or more capture devices, e.g., configured for obtaining panoramic content such as described in U.S. patent application Ser. No. 14/927,343 entitled "APPARATUS AND METHODS FOR ROLLING SHUTTER COMPENSATION FOR MULTI-CAMERA SYSTEMS" filed on Oct. 29, 2015, incorporated supra.

The processing apparatus 602 may include one or more physical processors 604 configured by machine-readable instructions 606 and/or other components. Executing the machine-readable instructions 606 may cause the one or more physical processors 604 to effectuate encoding of content using methodology of the disclosure. The machine-readable instructions 606 may include one or more of content component 607, an image partition component 608, a partition coding (e.g., encoding and/or decoding) component 610, a partition transformation component 612, a distribution component 614, and/or other components.

One or more features and/or functions of the processing apparatus 602 may be facilitation of video content acquisition, generation, and/or provision of content. It is noted that although the present disclosure is directed to videos and/or video clips, one or more other implementations of system 600 and/or processing apparatus 602 may be configured for other types of media items. By way of non-limiting example, other types of media items may include one or more of audio files (e.g., music, podcasts, audio books, and/or other audio files), documents, photos, multimedia presentations, digital purchases of goods and services, and/or other media items.

The processing apparatus 602 may include communication lines or ports to enable the exchange of information with a network and/or other entities. Illustration of processing apparatus 602 in FIG. 6 is not intended to be limiting. The processing apparatus 602 may include a plurality of hardware, software, and/or firmware components operating together to provide the functionality attributed herein to processing apparatus 602. For example, the processing apparatus 602 may be implemented by a cloud of computing platforms operating together as processing apparatus 602.

The processing apparatus 602 may include electronic storage 618. Electronic storage 618 may comprise electronic storage media that electronically stores information. The electronic storage media of electronic storage 618 may include one or both of system storage that is provided integrally (i.e., substantially non-removable) with processing apparatus 602 and/or removable storage that is removably connectable to processing apparatus 602 via, for example, a port or a drive. A port may include a USB port, a Fire Wire (IEEE Std. 1394) port, and/or other port. A drive may include a disk drive and/or other drive. Electronic storage 618 may include one or more of optically readable storage media (e.g., optical disks, etc.), magnetically readable storage media (e.g., magnetic tape, magnetic hard drive, floppy drive, and/or other magnetic storage media), electrical charge-based storage media (e.g., EEPROM, RAM, etc.), solid-state storage media (e.g., flash drive, etc.), and/or other electronically readable storage media. The electronic storage 618 may include one or more virtual storage resources (e.g., cloud storage, a virtual private network, and/or other virtual storage resources). The electronic storage 618 may be configured to store software algorithms, information determined by processor(s) 604, information received from processing apparatus 602, information received from external resource(s), and/or other information that enables processing apparatus 602 to function as described herein.

The system 600 may include an external resource(s) 624 operatively linked via one or more electronic communications interface 620. External resource(s) 624 may include sources of information, hosts, and/or other entities outside of system 600, external entities participating with system 600, computing platforms, and/or other resources. In some implementations, some or all of the functionality attributed herein to external resource(s) 624 may be provided by resources included in system 600.

It will be appreciated that this is not intended to be limiting and that the scope of this disclosure includes implementations in which processing apparatus 602, external resources 624, and/or other entities may be operatively linked via some other communication media.

Processor(s) 604 may be configured to provide information-processing capabilities in processing apparatus 602. As such, processor 604 may include one or more of a digital processor, an analog processor, a digital circuit designed to process information, an analog circuit designed to process information, a state machine, and/or other mechanisms for electronically processing information. Although processor 604 is shown in FIG. 6 as a single entity, this is for illustrative purposes only. In some implementations, processor 604 may include one or more processing units. These processing units may be physically located within a given device; the processor 604 may represent processing functionality of a plurality of devices operating in coordination. Processor 604 may be configured to execute components 607, 608, 610, 612, and/or 614 by software; hardware; firmware; some combination of software, hardware, and/or firmware; and/or other mechanisms for configuring processing capabilities on the processor 604 or other supporting components or logic.

It should be appreciated that although components 607, 608, 610, 612, and/or 614 are illustrated in FIG. 6 as being co-located within a single processing unit, in implementations in which processor 604 includes multiple processing units, one or more of components 607, 608, 610, 612, and/or 614 may be located: (i) distributed across the multiple processing units (and any supporting logic components associated therewith), and even remotely from the other components. The description of the functionality provided by the different modules or components 607, 608, 610, 612, and/or 614 described below is for illustrative purposes, and is not intended to be limiting, as any of components 607, 608, 610, 612, and/or 614 may provide more or less functionality than is described. For example, one or more of components 607, 608, 610, 612, and/or 614 may be eliminated, and some or all of its functionality may be provided by other ones of components 607, 608, 610, 612, and/or 614 and/or other components. As an example, processor 604 may be configured to execute one or more additional components that may perform some or all of the functionality attributed below to one of components 607, 608, 610, 612, and/or 614.

In FIG. 6, the content component 607 may be configured to access and/or manage image and/or audio content. In some implementations, the content component 607 may be configured to effectuate image/audio content acquisition using any applicable methodologies including those described herein. By way of an illustration, the content component 607 may be operable to instantiate content acquisition by the capture device 110 based on a timer event, user instruction, or a sensor event. In one or more implementations, the content component 607 may be operable to effectuate content acquisition by a VR headset. In some implementations, the content component 607 may be operable to access previously acquired content from, e.g., electronic storage 618 and/or external resource 624 (e.g., external storage, and/or remote user device during content upload). The operations performed by the content component 607 may include information timestamping, adjustment of data rate, transcoding, post processing (e.g., adjusting white balance, sharpening, contrast, gamma, and/or other parameters), trimming, and/or other operations. In some implementations, the image/audio content and the metadata may be stored in a multimedia storage container (e.g., MP4, MOV) such as described in detail in U.S. patent application Ser. No. 14/920,427, entitled "APPARATUS AND METHODS FOR EMBEDDING METADATA INTO VIDEO STREAM" filed on Oct. 22, 2015, incorporated supra, and/or in a session container (e.g., such as described in detail in U.S. patent application Ser. No. 15/001,038, entitled "METADATA CAPTURE APPARATUS AND METHODS" filed on Jan. 19, 2016, the foregoing being incorporated herein by reference in its entirety).

In FIG. 6 image partitioning component 608 may be configured to effectuate transformation (e.g., projection) and/or partitioning of one or more source images. In some implementations, the image transformation may include applying a spherical to cube transformation, a fisheye to cube transformation, fisheye to equirectangular transformation, and/or other transformations. In one implementation, the image partitioning component 608 may be configured to obtain a cubic projection (e.g., such as the image 400 of FIG. 4A, including one or more of portions 410, 404, 402, 406, 408, 412).

In FIG. 6, the partition coding component 610 may be configured to effectuate encoding and/or decoding operations for a partition of the image. In some implementations of encoding/decoding a cube projection, the partition coding component 610 may be configured to encode and/or decode one or more portions of the image (such as the image 400 comprised of e.g., facets 410, 404, 402, 406, 408, 412). By way of a non-limiting illustration, the partition coding component 610 may be configured to encode and/or decode portion 410 of image 400. The partition coding component 610 may be implemented using any applicable compression technique, for example macroblocks or coding units may be coded in raster scan order (as in H.264, HEVC, and/or other video encoding technology).

In FIG. 6, the transformation component 612 may be configured to transform encoded and/or decoded image portions. In some implementations, the transformation may include rotation, translation, scaling and/or warping (i.e., non-uniform scaling) operations. By way of an illustration, the transformation component 612 may be configured to obtain image portion 442 based on a rotation and translation of the encoded/decoded portion 410 of FIG. 4A.

In FIG. 6, a distribution component 614 may be configured to provide encoded/decoded content. The content provision may include storing the content on the electronic storage 618 for viewing, broadcasting content, and/or otherwise delivering content to one or more client devices (e.g., a smartphone) and/or external resource (e.g., cloud storage)), and/or other operations.

Figure 7A:
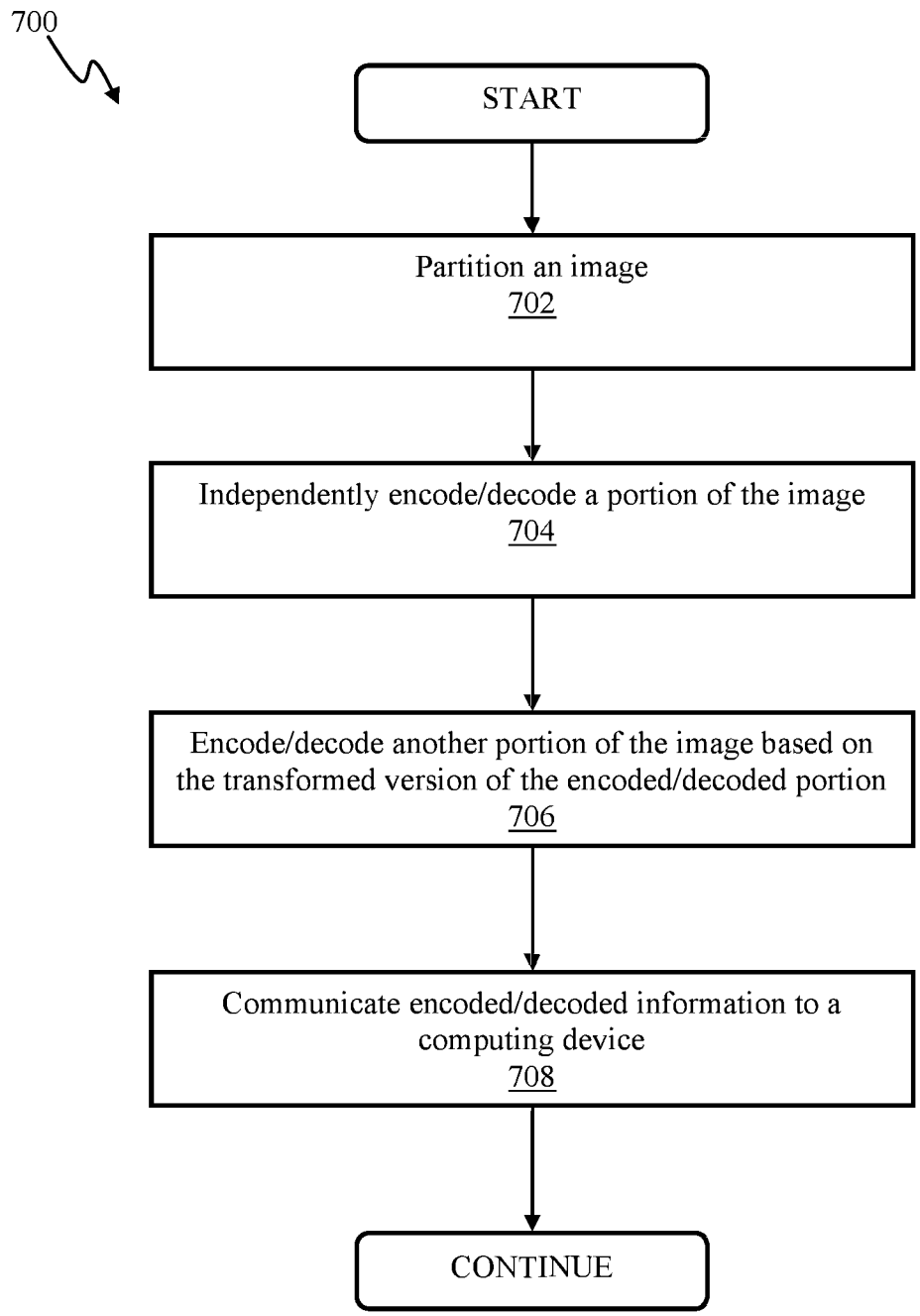
FIGS. 7A-7B are logical flow diagrams illustrating methods for image encoding and/or decoding in accordance with some implementation of the present disclosure.
Figure 7B:
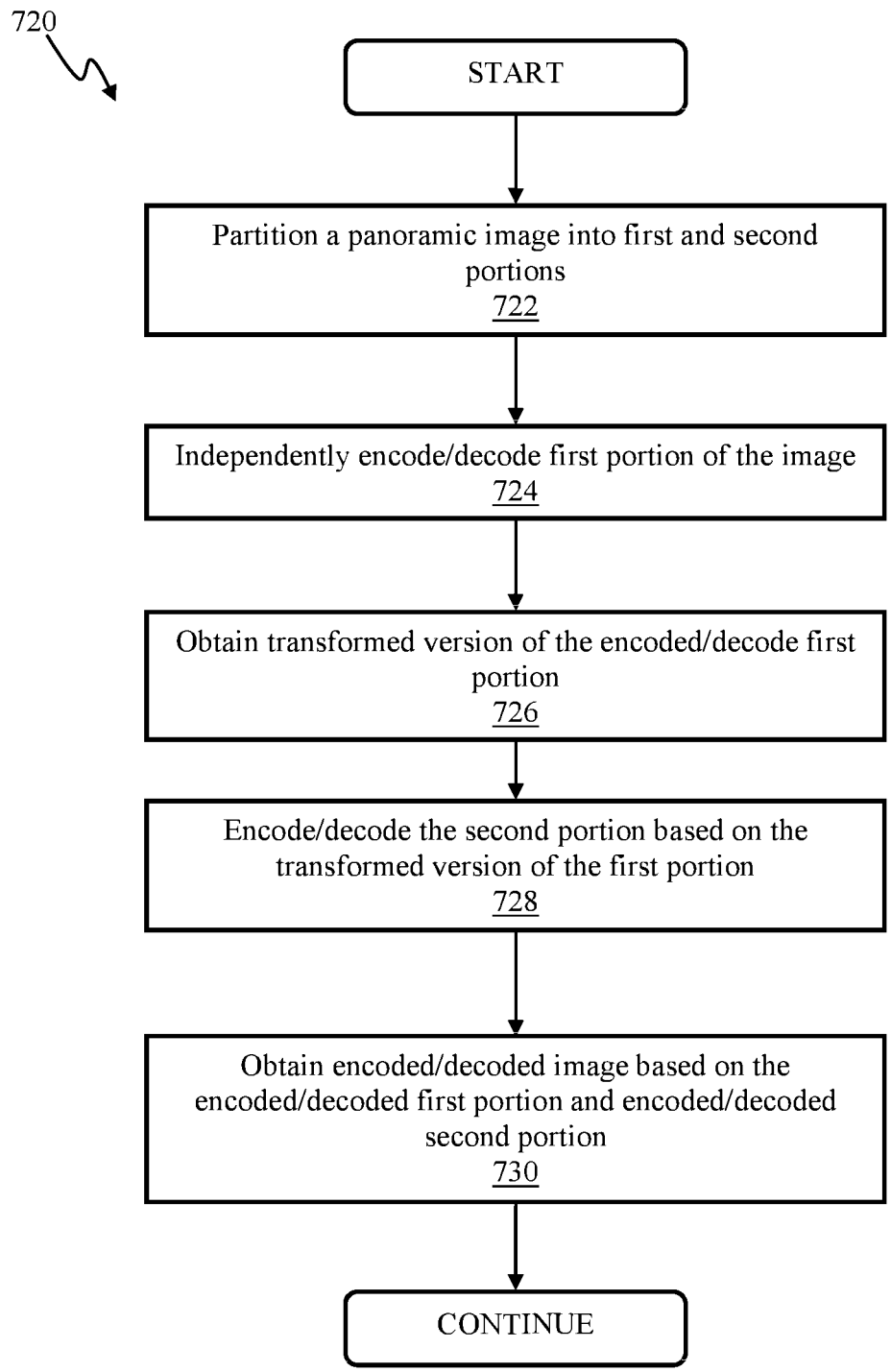

FIGS. 7A-7B illustrate methods 700, 720 for encoding and/or decoding of content in accordance with some implementations of the present disclosure. The operations of methods 700, 720 presented below are intended to be illustrative. In some implementations, methods 700, 720 may be accomplished with one or more additional operations not described, and/or without one or more of the operations discussed. Additionally, the order in which the operations of methods 700, 720 are illustrated in FIG. 7 and described below is illustrative, and not limiting.

In some implementations, methods 700, 720 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 700, 720 in response to instructions stored electronically on an electronic storage medium. The one or more processing devices may include one or more devices configured through hardware, firmware, and/or software to be specifically designed for execution of one or more of the operations of methods 700, 720. Operations of methods 700, 720 may be effectuated by one or more devices and/or computerized systems including those described with respect to FIGS. 1-2 and/or FIG. 6.

FIG. 7A illustrates a method of image encoding and/or decoding using an image partitioning methodology of the disclosure, in accordance with some implementations. Method 700 of FIG. 7A may be implemented by, e.g., system 600 of FIG. 6.

At operation 702 of method 700, an image may be partitioned. In some implementations, the image may correspond to an image of a sequence of images and/or an image of a video stream. The image may be represented using a cube projection (or a portion thereof), e.g., such as described with respect to FIG. 4A and/or FIG. 4C, tetrahedron, dodecahedron, truncated icosahedrons, pyramidal projection and/or other projection. Image partitioning operations may include selecting one or more boundaries for one or more facets of the projection, and/or selecting one or more of facets of the projection. In some implementations, individual facets may be organized in a structure, a 2-dimensional array, a 3-dimensional array, a vector of pixels, and/or other configurations. Image partitioning may include selecting a range of pixels corresponding to given facet (e.g., facets 410, 412 of FIGS. 4A-4B, facet 466 of FIG. 4C).

At operation 704 of method 700, an image partition may be encoded and/or decoded independent from one or more other partitions of the same image. For brevity, the partition being encoded/decoded at operation 704 may be referred to as partition A. Encoding/decoding operation 704 may be configured using any applicable encoder configuration, e.g., H.264, HEVC, and/or other codec. Encoding/decoding of the image portion A at operation 704 may be configured independent from other portions of the image. By way of an illustration, facet 410 of image 400 may be encoded/decoded independent from other facet(s) of the image. As used herein the term independent encoding/decoding may be used to describe encoding/decoding operation for a given portion of an image performed without utilizing information (e.g. motion estimation) obtained when encoding/decoding other portion(s) of the image; in other words without intra-picture encoding. It is noteworthy that when encoding an image sequence of a video, inter-picture prediction encoding may be utilized wherein a facet of an image at a given time t may be encoded using information from one or more facets of a prior image at t-deltaT.

At operation 706, another portion of the image may be encoded and/or decoded. For brevity, the partition being encoded/decoded at operation 706 may be referred to as partition B. Encoding/decoding operation 706 may be configured based on the transformed version of the encoded/decoded portion A obtained at operation 704. By way of an illustration, encoded facet 410 may be rotated and/or translated to obtain facets 442, 444, 446. The facet 404 may be encoded using cross boundary 414 prediction from encoded information of facet 442. When encoding object representation(s) that may appear in multiple facets of a projection (e.g., solid triangle appearing in facets 466, 464 in FIG. 4C), encoding one facet using, e.g., motion prediction across a facet boundary (e.g., encoding facet 466 using information from facet 462 across boundary 470) may provide for higher compression compared to encoding a facet independent from other facets of the image.

At operation 708 encoded information may be provided to a target destination, e.g., a target computerized apparatus. In some implementations, operation 708 may include providing encoded panoramic image or a portion thereof to a user interface device (e.g., from camera 110 to the device 120 in FIG. 1 or from the apparatus 602 of FIG. 6 to a display device). In one or more implementations, operation 708 may include storing encoded content (e.g., comprising encoded image portions) in electronic storage (e.g., 618 of FIG. 6) for subsequent provision to a client device.

FIG. 7B illustrates a method for encoding/decoding a portion of an image based on a transformed version of another encoded/decoded portion in accordance with some implementations of the present disclosure.

At operation 722 of method 720, a panoramic image may be partitioned into first and second portions. For example the partitioning may include obtaining facets 410, 404 of FIG. 4A and/or facets 466, 464 of FIG. 4C. In some implementations, operation 722 may include obtaining one or more additional portions of the image (e.g., facets 402, 406, 408, 412 of FIG. 4A.

At operation 724, the first portion of the image may be encoded/decoded independently from other portion(s) of the image. Encoding/decoding operation 724 may be configured using any applicable encoder configuration, e.g., H.264, HEVC, and/or other codec.

At operation 726, a transformed version of the encoded first portion may be obtained. In some implementations, the transformation operation 726 may include one or more of rotation, scaling, warping, and/or translation operations. By way of an illustration, the transformation operation 726 may include 90° counter clockwise rotation and translation to obtain transformed encoded/decoded image portion 462 from the encoded/decoded image portion 466 of FIG. 4C.

At operation 728, the second portion of the image may be encoded/decoded based on the transformed version of the first portion. Encoding/decoding operation 728 may be configured using any applicable encoder configuration, e.g., H.264, HEVC, and/or other codec. By way of an illustration, image portion 464 of FIG. 4C may be encoded using information of the transformed portion 462 across, e.g., boundary 470 thereby obtaining greater compression rate, and/or higher compression quality for encoding of the portion 464 compared to encoding/decoding the portion 464 independently from other image portions.

At operation 730, an encoded/decoded image may be obtained based on the encoded/decoded first portion and encoded/decoded second portion. By way of an illustration, operation 730 may be configured to produce an image that may include a side view and a top view of the cubic panoramic projection.

In some implementations methodology described herein may be used to encode video including a series of images. Individual images of the image sequence may be partitioned using e.g., operations 702, 722 of FIGS. 7A-7B. Facets of an image occurring at time T may be encoded using methodology described with respect to FIG. 5B, and/or FIG. 7A-7B. When encoding facets of a subsequent image (e.g., at time T+0.1T) a given facet (e.g., C(T+0.1T) in FIG. SB) may be encoded using information from one or more neighboring facets of the preceding image at time T, e.g., facets A(T), B(T), D(T), F(T) thereby effectuating an inter-frame encoding mode.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that may be used to communicate date between two or more entities. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in a system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J 2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J 2ME, Java Beans), Binary Runtime Environment (e.g., BREW), and the like.

As used herein, the terms "connection", "link", "transmission channel", "delay line", "wireless" means a causal link between any two or more entities (whether physical or logical/virtual), which enables information exchange between the entities.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variation), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the term "robot", "robotic device" may be used to describe an autonomous device, autonomous vehicle, computer, artificial intelligence (AI) agent, surveillance system or device, control system or device, and/or other computerized device configured for autonomous operation.

As used herein, the term "camera" may be used to refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed is:

1. A device, comprising:
a processor configured to:
obtain first facets of a first wide field-of-view image;
identify an object in a facet of the first facets;
obtain a second wide field-of-view image;
identify a location of the object in the second wide field-of-view image;
partition, using the location of the object, the second wide field-of-view image into second facets such that no boundary of any of the second facets overlaps the object; and
encode the second facets in a compressed bitstream.

2. The device of claim 1, wherein to encode the second facets in the compressed bitstream comprises to:
duplicate one of the second facets to obtain a duplicate facet;
obtain a frame, wherein the frame comprises the duplicate facet and the second facets, and wherein the frame comprises the one of the second facets and the duplicate facet as distinct facets; and
encode the frame.

3. The device of claim 2, wherein to duplicate the one of the second facets to obtain the duplicate facet comprises to:
obtain a transformed facet from the one of the second facets; and
combine the transformed facet with the second facets to obtain the frame.

4. The device of claim 3, wherein the transformed facet is obtained from the one of the second facets using at least one of a rotation operation or a translation operation.

5. The device of claim 4, wherein the rotation operation is one of a 900 counterclockwise rotation operation, a 90° clockwise rotation operation, or a 1800 rotation operation.

6. The device of claim 2, wherein a number of facets in the second facets is 6 and a number of facets in the frame is 12.

7. The device of claim 6, wherein the facets of the frame are arranged in 3 rows and 4 columns.

8. The device of claim 2, wherein a number of facets in the second facets is 6 and a number of facets in the frame is 18.

9. The device of claim 8, wherein the facets of the frame are arranged in 3 rows and 6 columns.

10. The device of claim 1, wherein the second wide field-of-view image is partitioned into the second facets using a projection operation.

11. A method for reducing decoding artefacts, comprising:
performing a first cube projection operation on a first wide field-of-view image to obtain first facets;
identifying an object in one of the first facets;
performing a second cube projection operation on a second wide field-of-view image to obtain second facets,
wherein the second cube projection operation is such that no boundary of any of the second facets overlaps the object, and
wherein the second wide field-of-view image is obtained at a different time from the first wide field-of-view image; and
encoding at least one of the second facets using at least one of the first facets.

12. The method of claim 11, wherein encoding at least one of the second facets using at least one of the first facets comprises:
obtaining a reference frame using the first facets; and
encoding the first facets using the reference frame.

13. The method of claim 12, wherein obtaining the reference frame using the first facets comprises:
duplicating at least one of the first facets to obtain a duplicate facet; and
obtaining the reference frame, wherein the reference frame comprises the duplicate facet and the first facets, and wherein the reference frame comprises the at least one of the first facets and the duplicate facet as distinct facets.

14. The method of claim 13, wherein the duplicate facet is obtained using at least one of a rotation operation or a translation operation.

15. The method of claim 14, wherein the rotation operation is one of a 900 counterclockwise rotation operation, a 90° clockwise rotation operation, or a 1800 rotation operation.

16. The method of claim 13, wherein a number of the first facets is smaller than a number of facets in the reference frame.

17. The method of claim 16, wherein the number of the first facets is 6 and the number of facets in the reference frame is at least 10.

18. A non-transitory computer readable medium storing instructions operable to cause one or more processors to perform operations to reduce decoding artefacts, the operations comprising to:
obtain a first image and a second image, wherein the first image and the second image are images of a wide field-of-view image;
use parallax information obtained using an overlap region between the first image and the second image to detect relative distances of a first object and a second object in at least one of the first image or the second image from one or more imaging devices used to obtain the first image and the second image, wherein the first object is detected to be farther away than the second object;
partition the wide field-of-view image into facets based on the relative distances such that no boundary of any of the facets overlaps the second object; and
encode the facets of the wide field-of-view image.

19. The non-transitory computer readable medium of claim 18, wherein to encode the facets of the wide field-of-view image comprises to:
obtain, from one of the facets, a transformed facet, wherein the transformed facet is obtained using at least one of a rotation operation or a translation operation; and
encode at least one of the facets using the transformed facet.

20. The non-transitory computer readable medium of claim 19, wherein the rotation operation is one of a 90° counterclockwise rotation operation, a 90° clockwise rotation operation, or a 180° rotation operation.

* * * * *

UNITED STATES PATENT AND TRADEMARK OFFICE
CERTIFICATE OF CORRECTION

| | |
|---|---|
| PATENT NO. | : 12,003,692 B2 |
| APPLICATION NO. | : 17/545156 |
| DATED | : June 4, 2024 |
| INVENTOR(S) | : Adeel Abbas, Balineedu Chowdary Adsumilli and David Newman |

It is certified that error appears in the above-identified patent and that said Letters Patent is hereby corrected as shown below:

In the Claims

Claim 5, Column 29, Line 49:
Replace "900" with --90°--

Claim 5, Column 29, Line 50:
Replace "1800" with --180°--

Claim 15, Column 30, Line 31:
Replace "900" with --90°--

Claim 15, Column 30, Line 32:
Replace "1800" with --180°--

Signed and Sealed this
Fifth Day of November, 2024

Katherine Kelly Vidal
*Director of the United States Patent and Trademark Office*